(12) United States Patent
Sawyer et al.

(10) Patent No.: US 10,585,994 B2
(45) Date of Patent: Mar. 10, 2020

(54) SYSTEMS AND METHODS FOR SECURE, OBLIVIOUS-CLIENT OPTIMIZATION OF MANUFACTURING PROCESSES

(71) Applicant: Paperless Parts, Inc., Boston, MA (US)

(72) Inventors: Scott M Sawyer, Auburndale, MA (US); Jason T. Ray, Boston, MA (US); James L. Jacobs, II, Amherst, NH (US); Matthew A. Sordillo, Francestown, NH (US); Dana A. Wensberg, Gloucester, MA (US); Steven M. Lynch, Hudson, NH (US)

(73) Assignee: PAPERLESS PARTS, INC., Boston, MA (US)

(*) Notice: Subject to any disclaimer, the term of this patent is extended or adjusted under 35 U.S.C. 154(b) by 0 days.

(21) Appl. No.: 15/974,368

(22) Filed: May 8, 2018

(65) Prior Publication Data
US 2019/0278878 A1    Sep. 12, 2019

Related U.S. Application Data

(60) Provisional application No. 62/639,841, filed on Mar. 7, 2018.

(51) Int. Cl.
G06F 17/50    (2006.01)
G06F 21/44    (2013.01)
G06F 21/60    (2013.01)

(52) U.S. Cl.
CPC .......... *G06F 17/5009* (2013.01); *G06F 21/44* (2013.01); *G06F 21/602* (2013.01); *G05B 2219/13186* (2013.01)

(58) Field of Classification Search
CPC ...... G06F 3/011; G06F 3/04815; G06F 17/50; G06T 19/00
See application file for complete search history.

(56) References Cited

U.S. PATENT DOCUMENTS

| 2013/0080287 A1* | 3/2013 | Currie | G06Q 30/0621 705/26.5 |
| 2016/0019815 A1* | 1/2016 | Hagerty | G09B 19/0053 434/118 |

* cited by examiner

*Primary Examiner* — Aniss Chad

(57) ABSTRACT

A system for secure, oblivious-client optimization of manufacturing processes includes manufacturer exchange module executing on a secure server, which receives from a plurality of manufacturer clients at least an identification of a manufacturing device operated by the at least a manufacturer and at least a manufacturing constraint, an avatar generator e configured to generate at least a manufacturing avatar, and a simulator executing on the secure server, the simulator designed and configured to receive a design of a part to be manufactured using an automated manufacturing device and at least an optimization criterion, and simulate at least a first manufacturing process using a first avatar manufacturer avatar of the plurality of manufacturer avatars.

21 Claims, 6 Drawing Sheets

SYSTEMS AND METHODS FOR SECURE, OBLIVIOUS-CLIENT OPTIMIZATION OF MANUFACTURING PROCESSES

FIELD OF THE INVENTION

The present invention generally relates to the field of computer security. In particular, the present invention is directed to a systems and methods for secure, oblivious-client optimization of manufacturing processes.

BACKGROUND

Manufacturing is an increasingly automated process, and automated manufacturing is increasingly a multi-party affair. Tasks from the design of parts to the production of the parts by manufacturers may be distributed between various entities and across networks. In particular, the process of choosing a manufacturing method, device, or facility for manufacturing a part frequently requires comparing options at various sites and selecting a preferred option based on the comparison. This process typically involves communicating a design to a number of would-be manufacturers or devices under the control of those manufacturers, receiving in return information describing the manufacturing techniques, quality, time for production, delivery method, and price from each manufacturer for each potential process. Unfortunately, receiving accurate information from the manufacturers generally requires communicating a prospective design to the manufacturers, resulting in a high degree of security risk by exposing intellectual property to a number of parties. This is compounded by the increasing geographic distribution of manufacturing and of supply chains, where the best manufacturer for a designer's needs may effectively be located beyond the reach of laws protecting a designer's invention. Manufacturers may also have varying levels of security to prevent misappropriation from third parties. As a result, designers face a tradeoff: exploring more potential processes for production may produce better results, but at a mounting risk of security breaches.

SUMMARY OF THE DISCLOSURE

In one aspect, a system for secure, oblivious-client optimization of manufacturing processes includes a manufacturer exchange module executing on a secure server. The manufacturer exchange module is designed and configured to interface with a plurality of manufacturer clients corresponding to a plurality of manufacturers and receive, from each manufacturer client of the plurality of manufacturer clients, at least an identification of a manufacturing device operated by the at least a manufacturer and at least a manufacturing constraint. The system includes an avatar generator executing on the secure server, the avatar generator designed and configured to generate at least a manufacturing avatar of the at least a manufacturer. Generating each manufacturer avatar of the at least a manufacturer avatar further includes providing a unique manufacturer identifier and generating the manufacturer avatar as a function of the at least an identification of the manufacturing device and the at least a manufacturing constraint. The system includes a simulator executing on the secure server, the simulator designed and configured to receive a design of a part to be manufactured using an automated manufacturing device and at least an optimization criterion and simulate at least a first manufacturing process using a first avatar manufacturer avatar of the plurality of manufacturer avatars.

In another aspect, method of secure, oblivious-client manufacture optimization includes receiving, at a manufacturer exchange module executing on a secure server, from each of a plurality of manufacturer clients corresponding to a plurality of manufacturers, at least an identification of a manufacturing device and at least a manufacturing constraint. The method includes generating, at the secure server, a plurality of manufacturer avatars corresponding to the plurality of manufacturers. Generating each manufacturer avatar of the plurality of manufacturer avatars further includes providing a unique manufacturer identifier and generating the manufacturer avatar as a function of the identification of the at least a manufacturing device and the at least a manufacture constraint. The method includes receiving a design of a part to be manufactured and at least an optimization criterion. The method includes generating at least a simulation of at least a first manufacturing process for manufacturing the part using at least a manufacturer avatar of the plurality of manufacturer avatars as a function of the design of the part. The method include selecting a manufacturing process for manufacturing the part as a function of the at least a simulation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
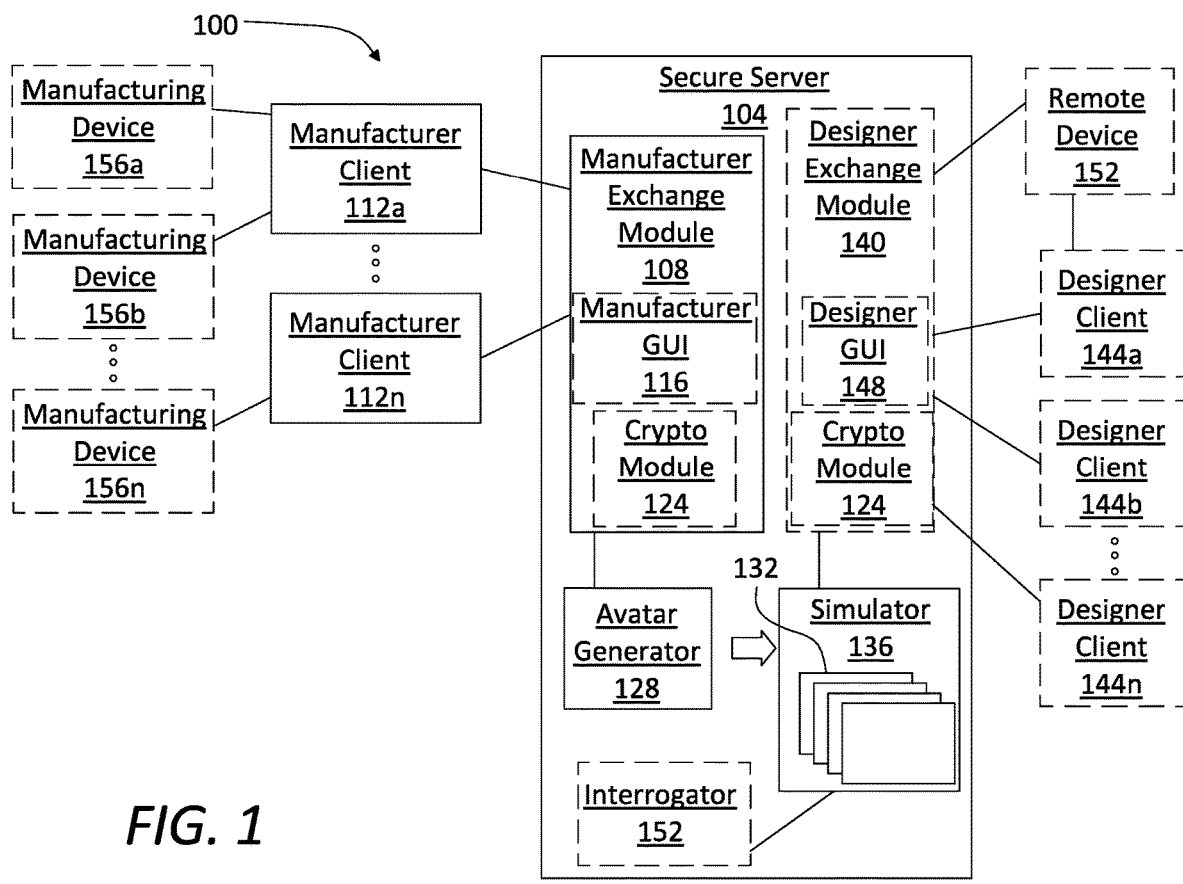
FIG. 1 is a block diagram illustrating an exemplary system for secure, oblivious-client optimization of manufacturing processes.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to providing secure systems and methods for planning, selecting, and initiating optimal manufacturing processes. Embodiments of systems described herein interface with manufacturers over a network, such as the Internet, to acquire information describing those manufacturers' equipment and capabilities. This information is used to simulate each manufacturer at a secure server to which the manufacturers may not have access, with the result that a designer may submit a design for a part to the server, choose a manufacturing process, and direct the initiation of the manufacturing process, without being required to communicate the design in question to any manufacturer until a choice has been made. Use of heuristics to predict manufacturing processes may result in rapid and accurate simulation, permitting a designer to choose and initiate manufacture in a timely and reliable manner. Manufacturers may enter information according to configurations or processes that suit them through a customizable user interface.

Manufacturing, as described herein, may be performed according to any manufacturing process or combination of manufacturing processes. Manufacturing process may include an additive manufacturing process. In an embodiment, an additive manufacturing process is a process in which material is added incrementally to a body of material in a series of two or more successive steps. A material may be added in the form of a stack of incremental layers; each layer may represent a cross-section of an object to be formed upon completion of an additive manufacturing process. Each cross-section may, as a non-limiting example be modeled on a computing device as a cross-section of graphical representation of the object to be formed; for instance, a computer aided design (CAD) tool may be used to receive or generate a three-dimensional model of an object to be formed, and a computerized process, such as a "slicer" or similar process, may derive from that model a series of cross-sectional layers that, when deposited during an additive manufacturing process, together will form the object. Steps performed by an additive manufacturing system to deposit each layer may be guided by a computer aided manufacturing (CAM) tool. Persons skilled in the art will be aware of many alternative tools and/or modeling processes that may be used to prepare a design for additive manufacture, including without limitation the production of stereolithography (STL) files and the like. In an embodiment, a series of layers are deposited in a substantially radial form, for instance by adding a succession of coatings to the workpiece. Similarly, a material may be added in volumetric increments other than layers, such as by depositing physical voxels in rectilinear form or other forms. Additive manufacturing, as used in this disclosure, may include manufacturing done at an atomic or nano level. Additive manufacturing may also include manufacturing bodies of material that are produced using hybrids of other types of manufacturing processes; for instance, additive manufacturing may be used to join together two portions of a body of material, where each portion has been manufactured using a distinct manufacturing technique. A non-limiting example may be a forged body of material. an example of a forged body of material may have welded material deposited upon it, which then comprises an additive manufactured body of material.

Deposition of material in an additive manufacturing process may be accomplished by any suitable means, including without limitation any "three-dimensional printing" process. Deposition may be accomplished by stereolithography, in which successive layers of polymer material are deposited and then caused to bind with previous layers using a curing process such as curing using ultraviolet light, for example. Additive manufacturing processes may include fused deposition modeling processes, in which a polymer material is deposited in a molten or otherwise fluid form in successive layers, each of which is cured by natural cooling or other means. Additive manufacturing processes may include processes that deposit successive layers of powder and binder; the powder may include polymer or ceramic powder, and the binder may cause the powder to adhere, fuse, or otherwise join into a layer of material making up the body of material or product. Likewise, additive manufacturing may be accomplished by immersion in a solution that deposits layers of material on a body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing, or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Examples of additively manufactured bodies of material include, but are not limited to, plates, slabs, blooms, billets, boards, blocks, among many other shapes, including curvilinear and multisided shapes, and any combination thereof, as set forth in further detail below. As for material(s) composing an additively manufactured body of material, the material(s) may be any suitable material(s), such as metal (solid, sintered, etc.), polymer (solid, foamed, etc.), composite, and multilayer material, or any combination of such materials, among others. Additively manufactured bodies of material may include shapes, such as organic shapes, that have been scanned, for instance and without limitation using LIDAR or similar scanning techniques; scanned shapes may be comprised of primitive shapes, which may be mapped and then additively manufactured. Fundamentally, there is no limitation on the composition of an additively manufactured body of material.

Manufacturing methods may include one or more subtractive processes. As used herein, a subtractive manufacturing process is a process that is performed by removal of material from a workpiece. A subtractive manufacturing process may be any suitable subtractive manufacturing process, such as, but not limited to, rotary-tool milling, electronic discharge machining, ablation, etching, erosion, cutting, and cleaving, among others. Fundamentally, there is no limitation on the type of subtractive manufacturing process(es) that may be used. In an example, differing subtractive manufacturing processes may be used before at different stages or to perform different steps of the subtractive manufacturing process as described below.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In an embodiment, milling equipment used for removing material may be of the computerized numerical control (CNC) type that is automated and operates by precisely programmed commands that control movement of one or more parts of the equipment to effect the material removal. CNC machines, their operation, programming, and relation to CAM tools and CAD tools are well known and need not be described in detail herein for those skilled in the art to understand the scope of the present invention and how to practice it in any of its widely varying forms.

Subtractive manufacturing may be performed using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water-jet or other fluid jet cutting techniques. Fundamentally, any process for removal of material may be employed for subtractive manufacturing.

Manufacturing processes may include molding processes. As used herein, a molding process may be any process wherein a malleable material, defined as a material that adopts the shape of a cavity into which it is inserted, is inserted into a cavity in an object, known as a "mold," formed to impose a desired shape on material inserted therein. Malleable material may include, without limitation, molten metal or polymer material, fluids curable through heat, chemical reaction, or radiation, froths composed of malleable material with bubbles dispersed therethrough, putty or clay-like malleable solids, and the like. Insertion may be accomplished by pouring, pressing, blowing, injecting, or otherwise introducing malleable material into the cavity of the mold. Malleable material may be cured or otherwise allowed to solidify or become more viscous; this process may be accomplished by allowing materials to cool until they enter a solid or more viscous state, heating to change the chemical nature of materials, curing by irradiation such as ultraviolet radiation, curing by mixture of chemicals to produce a solid or more viscous substance, and the like. Molding processes may include, without limitation, injection molding, blow molding, compression molding, extrusion molding, matrix molding, laminating, or any other molding process.

Manufacturing processes may include one or more processes for the manipulation of sheet material. Sheet material may be any material presented in a sheet of substantially uniform thickness, including without limitation sheets of metal, polymer material such as plastic, and the like. Manipulation of sheets of material may include, without limitation, bending, stretching, cutting, and/or stamping the material. Manipulation may be performed, as a non-limiting example, using one or more cutting or stamping dies.

Manufacturing processes may include finishing and/or coating processes. Finishing and/or coating may be a process in which additive, subtractive, or other methods are used to create a desired surface characteristic or the like in a completed product or component. Finishing and/or coating may include polishing or smoothing processes. Finishing and/or coating may include deposition of material on one or more surfaces of a workpiece, part, or component. Finishing and/or coating may include, without limitation, painting, grinding, dying, laser ablation, laser engraving, polymer coating, plating with metals, abrasive blasting, burnishing, buffing, such as by electroplating, blanching, case-hardening, peening, burnishing, glazing, cladding, conversion coating, knurling, galvanizing, varnishing, plasma-spraying, corona treatment, application of vitreous enamel, thin-film deposition, magnetic field-assisted finishing, or any other suitable treatment for producing a finished surface.

Referring now to FIG. 1, a block diagram of an exemplary embodiment of a system 100 for secure, oblivious-client optimization of manufacturing processes is illustrated. System 100 includes a secure server 104. Secure server 104 may be any computing device as described below in reference to FIG. 5. Secure server 104 may be any combination of computing devices as described below in reference to FIG. 5. Secure server 104 may be connected to a network as described below in connection with FIG. 5; the network may be the Internet. Secure server 104 may include, for instance, a first server or cluster of servers in a first location and a second server or cluster of servers in a second location. Secure server 104 may include computing devices that are dedicated to particular tasks; for instance, a single computing device or cluster of computing devices may be dedicated to the operation of queues described below, while a separate computing device or cluster of computing devices may be dedicated to storage and/or production of dynamic data as described in further detail below. Secure server 104 may include one or more computing devices dedicated to data storage, security, distribution of traffic for load balancing, and the like. Secure server 104 may distribute one or more computing tasks as described below across a plurality of computing devices of secure server 104, which may operate in parallel, in series, redundantly, or in any other manner used for distribution of tasks or memory between computing devices. Secure server 104 may be implemented using a "shared nothing" architecture in which data is cached at the worker; in an embodiment, this may enable scalability of system 100 and/or secure server 104.

Continuing to view FIG. 1, system 100 includes a manufacturer exchange module 108 executing on secure server 104. Manufacturer exchange module 108 may include any hardware module or logic circuitry. Manufacturer exchange module 108 may be instantiated using one or more commands of computer control logic. In an embodiment, manufacturer exchange module 108 may be designed and configured to interface with a plurality of manufacturer clients 112a-n corresponding to a plurality of manufacturers. Each manufacturer client of the plurality of manufacturer clients 112a-n may be implemented as one or more computing devices as described below in reference to FIG. 5, including without limitation any device or combination of devices suitable for use as secure server 104, any mobile device, desktop, laptop, or mainframe computer. Secure server 104 may connect to plurality of manufacturer clients 112a-n via one or more networks for electronic communication; one or more networks may include any combination of wireless or wired connections between computing devices. One or more networks may include the Internet, one or more localized networks, one or more virtual private networks, or any other network suitable for intercommunication between computing devices as described below in reference to FIG. 5.

Figure 2:
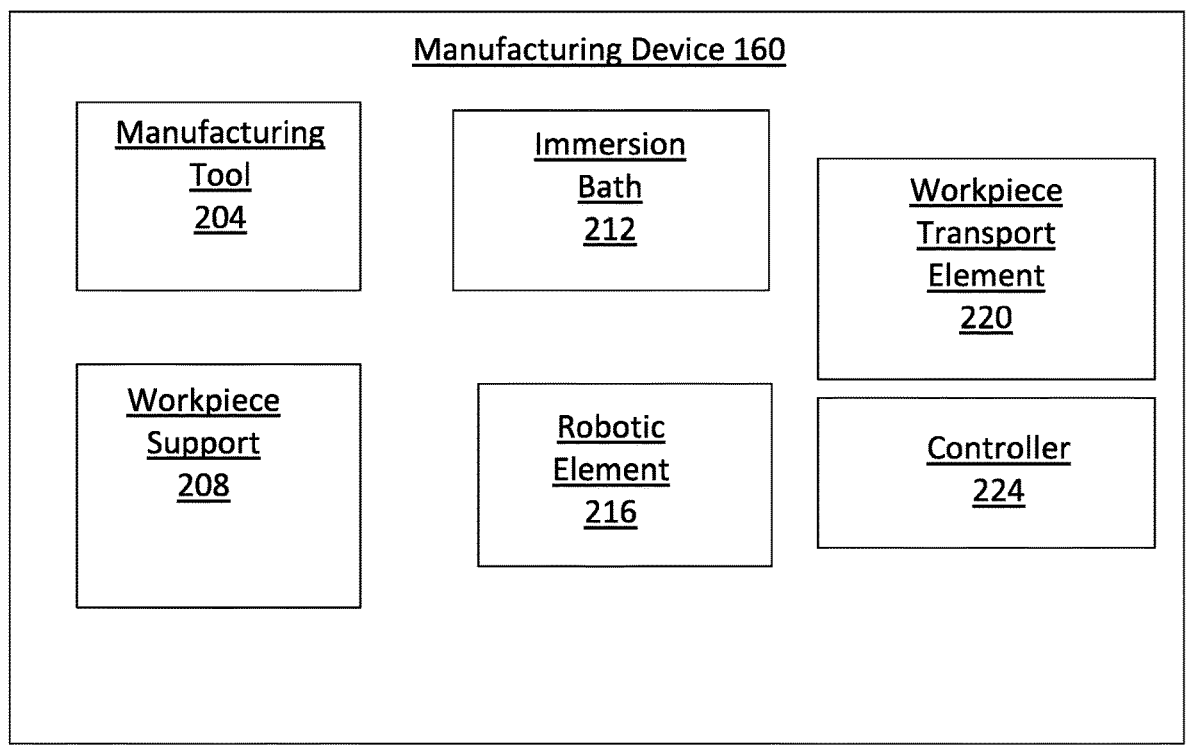
FIG. 2 is a block diagram illustrating an exemplary manufacturing device.

With continued reference to FIG. 1, manufacturer exchange module 108 may be designed and configured to receive, from each manufacturer client of the plurality of manufacturer clients 112a-n, at least an identification of a manufacturing device operated by a manufacturer, of the plurality of manufacturers, associated with the manufacturer client. As used herein, a manufacturing device is a device that may be used to form a product, which may be an end-product or a part used to assemble an end-product, by the performance of one or more manufacturing steps or processes as described above. Referring now to FIG. 2, a block diagram of an exemplary embodiment of a manufacturing device 160 is illustrated. Manufacturing device 160 may include at least a manufacturing tool 204. At least a manufacturing tool 204 may be any device that modifies a workpiece to produce a product. Manufacturing tool 204 may include an applicator or other additive device. For instance, manufacturing tool 204 may include a printer head for a 3D printer. Manufacturing tool 204 may include an extruding device for extruding fluid or paste material, a sprayer or other applicator for bonding material, an applicator for powering, a sintering device such as a laser, or other such material. Manufacturing tool 204 may include a cutting tool. Cutting tool may be a component that removes material from workpiece. In some embodiments, cutting tool includes at least an endmill, which may be a component that removes material when rotated against workpiece. Persons skilled in the art will be aware of many variants of endmill that may be used to remove material from a workpiece. Cutting tool may include a component that transfers motion from a motor (not shown) to at least an endmill; as a non-limiting example, component may be a spindle that rotates and as a result causes endmill to rotate. Manufacturing tool 204 may include a tool changer that can switch a plurality of endmills onto and off of manufacturing tool 204; for instance, tool changer may detach an endmill currently attached to a spindle and attach a different endmill to the same spindle, enabling the automated manufacturing device 160 to use more than one endmill in a single automated manufacturing process. Manufacturing tool 204 108 may include a tool changer that can switch a plurality of endmills onto and off of manufacturing tool 204 108. Manufacturing tool 204 may include a die. Manufacturing tool 204 may include a mold. Manufacturing tool 204 may include one or more nozzles, applicators, or other devices for introducing material to a mold. Manufacturing tool 204 may include a welder or other joining device.

Continuing to view FIG. 2 manufacturing device 160 may include a workpiece support 208. Workpiece support 208 may be a structure that supports a workpiece during the one or more manufacturing steps. Workpiece support 208 may include a base table. Base table may include a surface to which a workpiece or other components may be secured. Surface may be oriented horizontally, vertically, or in any other orientation. Surface may be substantially planar. Base table may include various mechanisms to attach components or workpieces to base table; for instance, base table may include a quick release attachment mechanism that can be used to attach any component having appropriate attachment features such as quick-release studs. Workpiece support 208 may include a fixture, which as used herein is a component used in a manufacturing device 160 to secure a workpiece to the manufacturing device 160 during the one or more manufacturing steps. A fixture may include, without limitation, one or more clamps, fasteners, vices, bolts, studs, quick-release attachment devices, straps, and chucks. A fixture may be one element of a set of fixtures; for instance, a workpiece may be secured in an automated manufacturing system by a plurality of fixtures, such as a plurality of bolts. Workpiece support 208 may include a substrate for initial deposition of material in an additive process.

Still viewing FIG. 2, manufacturing device 160 may include one or more additional elements, such as an immersion bath 212 for stereolithography, EDM, or other processes requiring immersion. Manufacturing device 160 may include one or more robotic elements robotic element 216, including without limitation robot arms for moving, rotating, or otherwise positioning a workpiece, or for positioning a manufacturing tool 204 to work on workpiece. Manufacturing device 160 may include one or more workpiece transport elements 220 for moving a workpiece or finished part or component from one manufacturing stage to another; workpiece transport elements 220 may include conveyors such as screw conveyors or conveyor belts, hoppers, rollers, or other items for moving an object from one place to another.

In some embodiments, manufacturing device 160 is a mechanical manufacturing device 160. A mechanical manufacturing device 160 as used herein is a manufacturing device 160 that deprives the user of some direct control over the toolpath, defined as movements the manufacturing tool 204 and workpiece make relative to one another during the one or more manufacturing steps. For instance, manufacturing tool 204 may be constrained to move vertically, by a linear slide or similar device, so that the only decision the user may make is to raise or lower the manufacturing tool 204; as a non-limiting example, where manufacturing device 160 is a manually operated machine tool, user may only be able to raise and lower a cutting tool, and have no ability to move the cutting tool horizontally. Similarly, where manufacturing tool 204 is a slide lathe, a blade on the slide lathe may be constrained to follow a particular path. As a further example, base table may be moveable along one or more linear axes; for instance, base table may be constrained to move along a single horizontal axis. In other embodiments, base table is constrained to movement along two horizontal axes that span two dimensions, permitting freedom of movement only in a horizontal plane; for instance, base table may be mounted on two mutually orthogonal linear slides.

Mechanical manufacturing device 160 may include one or more components that have movement constrained to rotation. As a non-limiting example, a fixture of a lathe to which a workpiece is attached may be constrained to rotate about an axis, constraining the workpiece to rotate about the axis as well. As a non-limiting example, manufacturing device 160 may include a rotary table. Rotary table may be able to rotate an object, such as a fixture or workpiece, mounted to a work surface of rotary table through an axis of rotation; rotary table may be able to rotate through at least 360 degrees. Objects may be attachable to rotary table using quick-release studs, bolts, or other attachment mechanisms. In some embodiments, base table is a rotary table. In other embodiments, rotary table is mounted on base table. Rotary table may have an axis of rotation parallel to surface of base table. Rotary table may be able to rotate an object mounted to rotary table through an axis perpendicular to a direction of application of manufacturing tool 204. In some embodiments, this enables manufacturing tool 204 to modify a workpiece mounted to rotary table at any exposed point of the workpiece that may be rotated to face manufacturing tool 204. Multiple rotary elements may be combined to enable additional rotational degrees of freedom, for instance using a trunnion table or similar apparatus. Components constrained to rotation and components constrained to linear movement may be combined in various ways. For instance, and without limitation, a trunnion table may be mounted to a base table having x and y-axis linear slides; this may be combined with a z-axis linear slide, for instance bearing the manufacturing tool, resulting in a "five-axis" mechanical manufacturing device, such as those sometimes described as five-axis CNC machines. Similarly, a rotational table having an axis in the z direction may be combined with a base table having one or more linear slides and/or a trunnion table or other rotary table.

Manufacturing device 160 may include a powered manufacturing device 160. As used herein, a powered manufacturing device 160 is a manufacturing device 160 in which at least one component of the manufacturing device 160 includes at least a component powered by something other than human power. At least a component may be powered by any non-human source, including without limitation electric power generated or stored by any means, heat engines including steam, internal combustion, or diesel engines, wind power, water power, pneumatic power, or hydraulic power. Powered components may include any components of manufacturing device 160. Manufacturing tool 204 may be powered; for instance, manufacturing tool 204 may include an endmill mounted on a spindle rotated by a motor (not shown). Workpiece support 208 may be powered. Where manufacturing device 160 is a mechanical device, motion of components along linear or rotary constraints may be powered; for instance, motion of base table along one or more linear constraints such as linear slides may be driven by a motor or other source of power. Similarly, rotation of rotary table may be driven by a power source. Tool-changer, where present, may be driven by power. In some embodiments, all or substantially all of the components of manufacturing device 160 are powered by something other than human power; for instance, all components may be powered by electrical power.

Manufacturing device 160 may include an automated manufacturing system. In some embodiments, an automated manufacturing system is a manufacturing device 160 including a controller 224 that controls one or more manufacturing steps automatically. Controller 224 may include a sequential control device that produces a sequence of commands without feedback from other components of automated manufacturing system. Controller 224 may include a feedback control device that produces commands triggered or modified by feedback from other components. Controller 224 may perform both sequential and feedback control. In some embodiments, controller 224 includes a mechanical device. In other embodiments, controller 224 includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device. Computing device may include any computing device as described below in reference to FIG. 5. Computing device may include a computing device embedded in manufacturing device 160; as a non-limiting example, computing device may include a microcontroller 224, which may be housed in a unit that combines the other components of manufacturing device 160. Controller 224 may include a manufacturer client of plurality of manufacturer clients; controller 224 may be communicatively coupled to a manufacturer client of plurality of manufacturer clients.

Controller 224 may include a component embedded in manufacturing device 160; as a non-limiting example, controller 224 may include a microcontroller 224, which may be housed in a unit that combines the other components of manufacturing device 160. Further continuing the example, microcontroller 224 may have program memory, which may enable microcontroller 224 to load a program that directs manufacturing device 160 to perform an automated manufacturing process. Similarly, controller 224 may include any other components of a computing device as described below in reference to FIG. 5 in a device housed within manufacturing device 160. In other embodiments, controller 224 includes a computing device that is separate from the rest of the components of manufacturing device 160; for instance, controller 224 may include a personal computer, laptop, or workstation connected to the remainder of manufacturing device 160 by a wired or wireless data connection. In some embodiments, controller 224 includes both a personal computing device where a user may enter instructions to generate a program for turning workpiece into a finished product, and an embedded device that receives the program from the personal computing device and executes the program. Persons skilled in the art will be aware of various ways that a controller 224, which may include one or more computing devices, may be connected to or incorporated in an automated manufacturing system as described above.

Controller 224 may control components of automated manufacturing system; for instance, controller 224 may control elements including without limitation tool changer to switch endmills, spindle or gear systems operatively coupled to spindle to regulate spindle rotational speed, linear movement of manufacturing tool 204, base table, or both, and rotation or rotational position of rotary table. As an example, in embodiments involving subtractive manufacturing, the equipment used for removing material may be of the computerized numerical control (CNC) type that is automated and operates by precisely programmed commands that control movement of one or more parts of the equipment to effect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms. Similarly, controller 224 may coordinate deposition and/or curing of material in additive manufacturing processes, where manufacturing device 160 is an additive manufacturing device 160. Persons skilled in the art, upon reading the entirety of this disclosure, will be aware of similar automated control systems usable for various forms manufacturing.

Referring again to FIG. 1, manufacturer exchange module 108 may be designed and configured to receive at least a manufacturing constraint from a manufacturer client of plurality of manufacturer clients. At least a manufacturing constraint may be any limitation affecting the ability of a manufacturing process, as performed by a manufacturer of plurality of manufacturers, to manufacture a part described in a design, manufacture a feature described in a design, or meet an optimization criterion as defined in further detail below. As a non-limiting example, at least a manufacturing constraint may be a lead time for the use of a particular manufacturing device 160 or facility. At least a manufacturing constraint may indicate a category of material that a particular manufacturer or manufacturing device 160 may be unable to work with. At least a manufacturing constraint may indicate that a particular manufacturing process cannot be performed by a manufacturer; for instance due to presence or availability or required equipment or skilled operators. As another example, a particular manufacturer operating a subtractive device such as a CNC machine may be unwilling or unable to perform an undercut, and at least a manufacturing constraint may so indicate. At least a manufacturing constraint may describe one or more circumstances, such as optimization criteria and/or combinations thereof as described in further detail below, under which manufacturer will not perform a manufacturing process. At least a manufacturing constraint may include at least a weight as described in further detail below; manufacturer may assign the weight to reflect a degree to which temporal or physical limitations of equipment or personnel performing a manufacturing process or category of manufacturing processes affect the willingness of the manufacturer to perform the process or category of processes. Weight may be an expression of value to designer and/or manufacturer of a particular outcome, attribute value, or other facet of manufacturing process; value may be expressed, as a non-limiting example, in remunerative form, such as a quantity of a medium of exchange, a monetary unit, or the like. In an embodiment, assignment of weight may impose a cost for a costing algorithm analogous or complementary to a costing algorithm as described below in reference to optimization criteria; this may enable direct comparison of optimization criteria, as described below to simulations of manufacturing, for instance by way of weighted aggregation. At least a weight may vary depending on one or more factors; for instance, at least a weight may be greater for small batches of identical or heterogenous parts and smaller for larger batches of identical or heterogenous parts. Weights may be applied to additional variables, elements, functions, or quantities, including without limitation part quality (e.g. mechanical strength of a part, which may be a function of material and process), shipping distance, availability, speed, method (e.g. nautical shipping versus rail or airplane shipping), door-to-door time, and/or time in transit, packaging quality, and the like. Shipping may be subject to manufacturing constraints as well, such as, for instance, certain shipping methods or packaging techniques being unavailable for parts or products that are fragile or perishable.

Figure 3A:
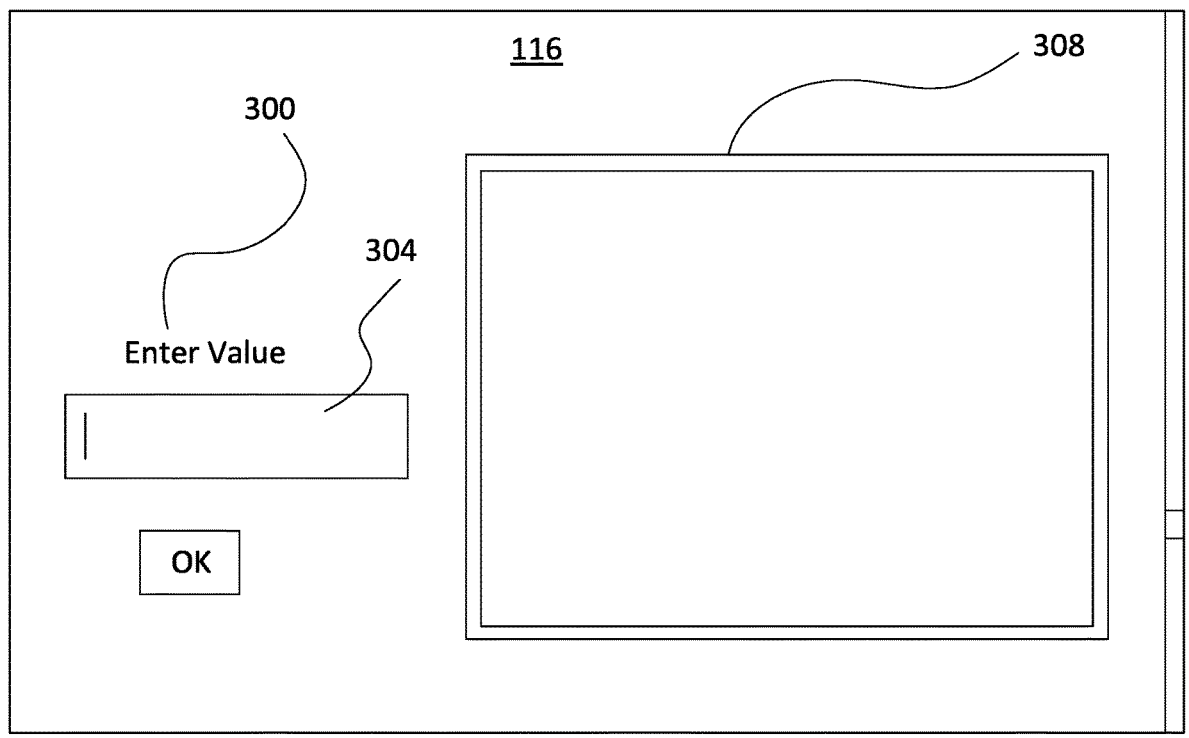
FIG. 3A is a schematic diagram illustrating an exemplary GUI.

Still referring to FIG. 1, manufacturer exchange module 108 may interface with plurality of manufacturer clients 112a-n according to any communication protocol for exchange of information over a network. One or more manufacturer clients 112a-n of plurality of manufacturer clients 112a-n may convey information to manufacturer exchange module 108 automatedly, as described in further detail below. Alternatively or additionally, manufacturer exchange module 108 may include a manufacturer graphical user interface (GUI) 116. FIG. 3A is an exemplary block diagram illustrating an embodiment of manufacturer GUI 116. Manufacturer GUI 116 may be designed and configured to prompt at least a user of a manufacturer client of the plurality of manufacturer clients 112a-n to provide at least one of the identification of the at least a manufacturing device 160 and the at least a manufacturing constraint at least one of identification of at least a manufacturing device 160 and the at least a manufacturing constraint; at least one of the identification of at least a manufacturing device 160 and the at least a manufacturing constraint, as used herein, may be either the identification of at least a manufacturing device 160, the at least a manufacturing constraint, or both. Prompting may be accomplished by displaying text 300 indicating where the user should enter the identification of the at least a manufacturing device 160 and/or the at least a manufacturing constraint. The text 300 may be presented as text 300 on a web page, in a pop-up window, or in any other suitable format. User prompts may alternatively or additionally be provided in other forms, including using images such as icons, using audio prompts, video and/or animated prompts, or disability-accessible forms of communication.

Still viewing FIG. 3A, manufacturer GUI 116 may be designed and configured to provide at least a graphical field 304 for accepting a user instruction providing the identification of the at least a manufacturing device 160 and the at least a manufacturing constraint; as used herein, a "graphical field 304" is any item the user may interact with to provide data to a GUI. At least a graphical field 304 may include a field 304 that provides a set of alternative values from which the user may choose one or more values; as a non-limiting example, GUI may provide a drop-down list of manufacturing devices 160s from which a user may select one or more devices in use at a manufacturer, a set of radio buttons or checkboxes, or the like. At least a graphical field 304 may be include a text entry field 304 in which a user may type or otherwise enter text 300. At least a graphical field 304 may include an element permitting a user to upload a file, for instance using File Transfer Protocol (FTP) or the like. At least a graphical field 304 may include any combination of the above, including combinations that coordinate, such as a text entry field 304 that filters a drop-down list for items containing text 300 entered in the text entry field 304. At least a graphical field 304 may include a code window 308 in which a user may enter one or more text 300 entries to be converted into executable commands as described in further detail below. At least a graphical field 304 may include a field 304 generated by an executable command converted from user text 300 entries as described in further detail below.

With continued reference to FIG. 3A, manufacturer GUI 116 may be designed and configured to receive, from the manufacturer client, at least one of identification of the at least a manufacturing device 160 and at least a manufacturing constraint. Receiving may be triggered by the activation of one or more event handlers or event listeners; for instance, entry of a value in at least a graphical field 304 may cause manufacturer GUI 116 to receive that value, some subset of all values entered by the user, or all the values entered by the user. Event handlers and/or event listeners alternatively or additionally be triggered by elements including without limitation a button, link, or other element selected by a user, movement of a mouse or other section device, navigation away from a page displayed by manufacturer GUI 116, or the like. Manufacturer GUI 116 may use alternative means to receive at least one of identification of the at least a manufacturing device 160 and at least a manufacturing constraint, such as iterative sampling, timed sampling, or the like. At least one of identification of the at least a manufacturing device 160 and at least a manufacturing constraint may be stored in one or more variables, which may include without limitation variables provided by system 100 and/or variables defined by an executable command converted from user text 300 entries as described in further detail below.

Figure 3B:
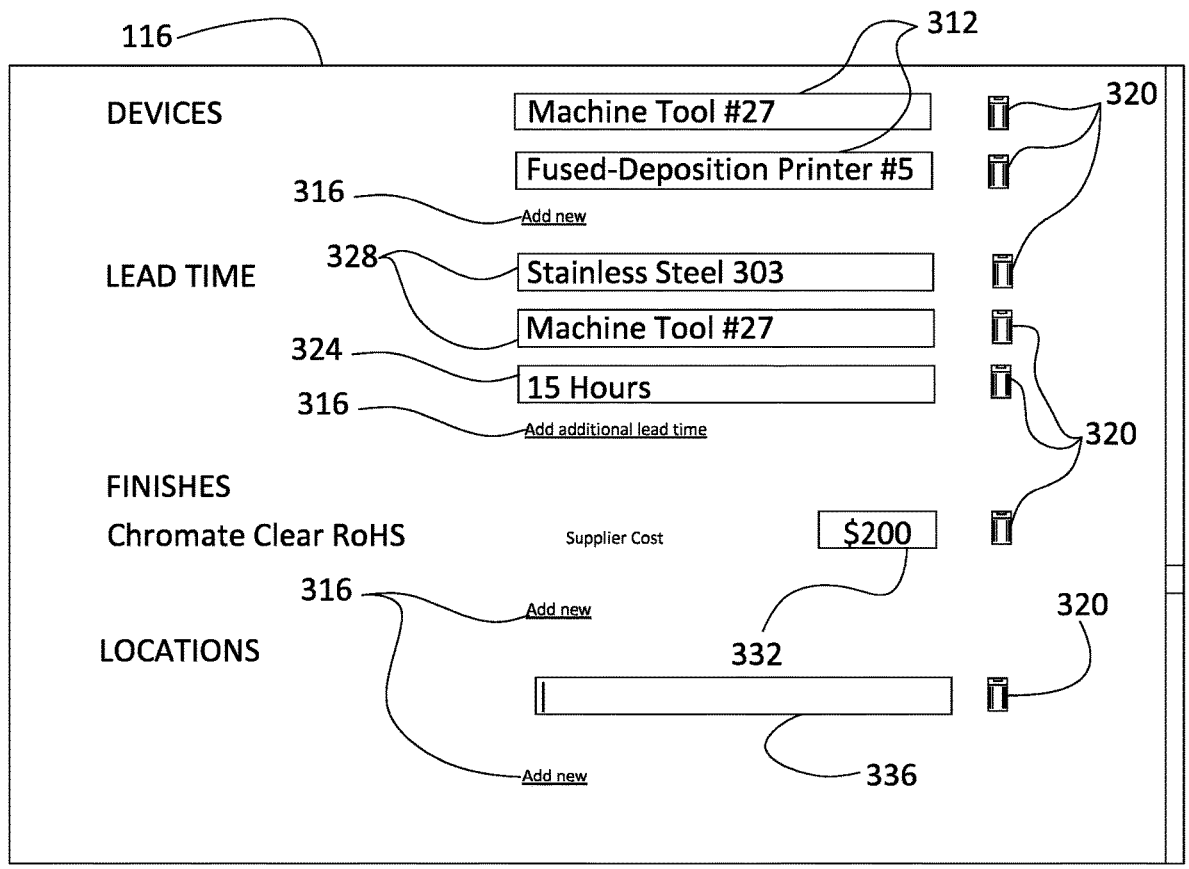
FIG. 3B is a schematic diagram illustrating an exemplary GUI.

Referring now to FIG. 3B, an exemplary embodiment of a manufacturer GUI 116 is illustrated. Manufacturer GUI 116 may include one or more manufacturing device selection fields 312, which may provide any means for data entry suitable for any embodiment of at least a graphical field 304 as described above, including without limitation, a drop-down, an event handler prompting a wizard for manufacturing device identification and selection, a free-form text entry field with or without autofill and/or correction by reference to stored identities of manufacturing devices, or any other suitable data entry protocol. Manufacturer GUI 116 may include one or more field addition graphical fields 316 permitting a user to add one or more additional graphical entry fields, such as additional manufacturing device selection fields 312, for instance and without limitation on selection of the one or more field addition graphical fields 316 by a user. Manufacturer GUI 116 may include one or more field deletion graphical fields 320 permitting a user to remove one or more additional graphical entry fields, such as additional manufacturing device selection fields 312, for instance and without limitation on selection of the one or more field deletion graphical fields 320 by a user. Manufacturer GUI 116 may include one or more temporal constant entry fields 324; one or more temporal constant entry fields 324 may be fields permitting a user to enter one or more constant quantities affecting temporal features of a manufacturing process or avatar, for instance and without limitation as multipliers, additions, or exponents. Manufacturer GUI may include one or more context entry fields 328 connected to the one or more temporal constant entry fields; for instance, context entry fields 328 may permit a user to specify a manufacturing device or material with respect to which a temporal constant may apply. As a non-limiting example, user may enter a first lead time relating to a first material to be used in a process on a first manufacturing device, and a second lead time relating to a second material to be used in a process on the first manufacturing device; additional lead times may be entered for identical or distinct materials on other manufacturing devices as well. Manufacturer GUI 116 may include at least a weight function entry field 332, where a user may enter any weight and/or function of one or more weights, as described in further detail herein. Each of the above entry fields may correspond to a variable or function specified by the system or created by the user, for instance using code window 308 as described herein for entry of functions and/or variables using a code window. For instance, a user may create a cost function relating one or more weights to variables, temporal dependencies to be generated with a manufacturer avatar, or the like; this cost function may be assigned to a value to be entered in a weight function entry field 332. Alternatively or additionally, user may utilize a weight function entry field 332 to enter a single weight. Persons skilled in the art, upon reviewing the entirety of this disclosure, will be aware of various ways in which a user may create and/or enter value in a weight function entry field 332 as described and illustrated herein. Manufacturer GUI may include a location entry field 336 for entering a location of a manufacturer, or of a facility operated by the manufacturer; location entry field 336 may be any graphical field 304 as described above for the entry of data by a user.

Referring again to FIG. 1, manufacturer exchange module 108 may include a cryptographic module 124. Cryptographic module 124 may protect sent or received data using a cryptographic system. In one embodiment, a cryptographic system is a system that converts data from a first form, known as "plaintext," which is intelligible when viewed in its intended format, into a second form, known as "cyphertext," which is not intelligible when viewed in the same way. The cyphertext is may be unintelligible in any format unless first converted back to plaintext. In one embodiment, the process of converting plaintext into cyphertext is known as "encryption." The encryption process may involve the use of a datum, known as an "encryption key," to alter the plaintext. The cryptographic system may also convert cyphertext back into plaintext, which is a process known as "decryption." The decryption process may involve the use of a datum, known as a "decryption key," to return the cyphertext to its original plaintext form. In embodiments of cryptographic systems that are "symmetric," the decryption key is essentially the same as the encryption key: possession of either key makes it possible to deduce the other key quickly without further secret knowledge. The encryption and decryption keys in symmetric cryptographic systems may be kept secret, and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 1, in embodiments of cryptographic systems that are "asymmetric," either the encryption or decryption key cannot be readily deduced without additional secret knowledge, even given the possession of the corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which the encryption key involves the use of numbers that are products of very large prime numbers, but the decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Continuing to refer to FIG. 1, in some embodiments, secure server 104 and plurality of manufacturer clients 112a-n and secure server 104 encrypt data prior to exchanging the data, using a cryptographic system as described above. In one embodiment, plurality of manufacturer clients 112a-n and secure server 104 exchange the data using public key cryptography; for instance, the client and the secure server 104 may each generate a public and private key, exchange public keys, and encrypt the data using each others' public keys while decrypting it using each others' private keys.

With continued reference to FIG. 1, in some embodiments, plurality of manufacturer clients 112a-n authenticates secure server 104 or vice-versa using digital certificates. In one embodiment, a digital certificate is a file that conveys information and links the conveyed information to a "certificate authority" that is the issuer of a public key in a public key cryptographic system. The certificate in some embodiments contains data conveying the certificate authority's authorization for the recipient to perform a task. The authorization may be the authorization to access a given datum. The authorization may be the authorization to access a given process. In some embodiments, the certificate may identify the certificate authority.

Still referring to FIG. 1, linking may be performed by the formation of a digital signature. In one embodiment, a digital signature is an encrypted mathematical representation of a file using the private key of a public key cryptographic system. The signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if the mathematical representation of the file is well-designed and implemented correctly, any alteration of the file will result in a mismatch with the digital signature; the mathematical representation may be produced using an alteration-sensitive, reliably reproducible algorithm, such as a hashing algorithm. A mathematical representation to which the signature may be compared may be included with the signature, for verification purposes; in other embodiments, the algorithm used to produce the mathematical representation is publicly available, permitting the easy reproduction of the mathematical representation corresponding to any file. In some embodiments, a third party known as a certificate authority is available to verify that the possessor of the private key is a particular entity; thus, if the certificate authority may be trusted, and the private key has not been stolen, the ability of an entity to produce a digital signature confirms the identity of the entity and links the file to the entity in a verifiable way. The digital signature may be incorporated in a digital certificate, which is a document authenticating the entity possessing the private key by authority of the issuing certificate authority and signed with a digital signature created with that private key and a mathematical representation of the remainder of the certificate. In other embodiments, the digital signature is verified by comparing the digital signature to one known to have been created by the entity that purportedly signed the digital signature; for instance, if the public key that decrypts the known signature also decrypts the digital signature, the digital signature may be considered verified. The digital signature may also be used to verify that the file has not been altered since the formation of the digital signature.

Continuing to refer to FIG. 1, secure server 104 and plurality of manufacturer clients 112a-n may communicate using a security combining public key encryption, private key encryption, and digital certificates. For instance, plurality of manufacturer clients 112a-n may authenticate secure server 104 using a digital certificate provided by the secure server 104. Secure server 104 may authenticate plurality of manufacturer clients 112a-n using a digital certificate provided by the plurality of manufacturer clients 112a-n. After successful authentication, the device that received the digital certificate possesses a public key that corresponds to the private key of the device providing the digital certificate; the device that performed the authentication may then use the public key to convey a secret to the device that issued the certificate. The secret may be used as the basis to set up private key cryptographic communication between plurality of manufacturer clients 112a-n and secure server 104; for instance, the secret may be a private key for a private key cryptographic system. The secret may be a datum from which the private key may be derived. Plurality of manufacturer clients 112a-n and secure server 104 may then use that private key cryptographic system to exchange information until the session in which they are communicating ends. In some embodiments, this handshake and secure communication protocol is implemented using the secure sockets layer (SSL) protocol. In other embodiments, the protocol is implemented using the transport layer security (TLS) protocol. Secure server 104 and plurality of manufacturer clients 112a-n may communicate using hyper-text transfer protocol secure (HTTPS). Secure server 104 and plurality of manufacturer clients 112a-n may communicate using transport securing layer (TLS) protocols, which may include without limitation TLS 1.0, 1.1, 1.2, and progeny. Secure server 104 and plurality of manufacturer clients 112a-n may communicate using "websockets," which may be encrypted using any suitable cryptographic protocol including without limitation TLS. In an embodiment, cryptographic module 124 may be designed and configured to encrypt data transmitted to manufacturer clients of plurality of manufacturer clients. In an embodiment, cryptographic module 124 may be designed to decrypt data received from manufacturer clients of plurality of manufacturer clients.

Still referring to FIG. 1, system 100 includes an avatar generator 128 executing on secure server 104. Avatar generator 128 may include any hardware module or logic circuitry. Avatar generator 128 may be instantiated using one or more commands of computer control logic. In an embodiment, avatar generator 128 may be designed and configured to generate at least a manufacturing avatar of the at least a manufacturer. Generating each manufacturer avatar of the at least a manufacturer avatar may include providing a unique manufacturer identifier. Generating each manufacturer avatar may include generating the manufacturer avatar as a function of the at least an identification of the manufacturing device 160 and the at least a manufacturing constraint, as described in further detail below. A manufacturer avatar, as used herein, is a module that simulates manufacture as described in further detail below, by representing the behavior of at least part of a manufacturer; at least part of a manufacturer may be the entire manufacturer, a branch of the manufacturer, such as a branch that performs a particular manufacturing process, a particular manufacturing environment such as a machine room or factory floor, or one or more manufacturing device 160s. Manufacturer avatars may nest; in other words, a manufacturer avatar representing an entire manufacturer of plurality of manufacturers may contain manufacturer avatars representing branches or manufacturing environments of the manufacturer, which may in turn contain manufacturer avatars representing one or more manufacturing device 160s.

With continued reference to FIG. 1, system 100 may include a simulator 136 executing on the secure server 104. Simulator 136 may include any hardware module or logic circuitry. Simulator 136 may be instantiated using one or more commands of computer control logic. In an embodiment, simulator 136 is designed and configured to receive a design of a part to be manufactured using an automated manufacturing device 160 and at least an optimization criterion; reception this may be accomplished by any suitable means. As a non-limiting example, design and/or optimization criterion may be generated at secure server 104, for instance using a computer modeling program as described in further detail below. As another non-limiting example, design and/or optimization criterion may be received from a device remote from secure server 104. In an embodiment, System 100 includes a designer exchange module 140, which may be implemented according to any means or method suitable for the implementation of manufacturer exchange module 108. Designer exchange module 140 may interface with at least a designer client; at least a designer client may be implemented according to any means or method suitable for the implementation of plurality of manufacturer clients 112a-n. A designer client may be a manufacturer client as well; that is, manufacturer may sometimes act as a designer for the purposes of embodiments disclosed herein. Designer exchange module 140 may interface with one or more remote device 152, which may include third-party services for generation of designs and/or communication of designs. Designer exchange module 140 may include a designer GUI 148, which may receive data and/or files including without limitation designs of parts, using any means or methods suitable for the implementation of manufacturer GUI 116. Designer exchange module 140 may include a cryptographic module 124 as described above.

Continuing to refer to FIG. 1, design of a part to be manufactured may include a graphical model of the part; graphical model may be any model used to simulate visually one or more features of the part, including without limitation a CAD file, CAM file, STL file, or the like. Graphical model may be stored in memory of secure server 104 in any suitable manner. One of more features of the part may include any geometric shape to be formed on the part by any manufacturing process. One or more features of the part may include one or more materials or combinations of materials that will make up the part, a finish of the part, an intended physical characteristic of the part such as hardness, flexibility, or the like, or any other detail concerning the manufacture of the part.

Still referring to FIG. 1, at least an optimization criterion may include any description of a desired value or range of values for one or more attributes of a manufacturing process; desired value or range of values may include a maximal or minimal value, a range between maximal or minimal values, or an instruction to maximize or minimize an attribute. As a non-limiting example, an optimization criterion of at least an optimization criterion may specify that the part should be manufactured as quickly as possible (i.e., may instruct that manufacturing time be minimized); an optimization criterion may cap manufacturing time, for instance specifying that it must be completed before a certain date or time, or within a certain period of time. An optimization criterion may alternatively request that manufacturing time be greater than a certain value. An optimization criterion may specify one or more tolerances for precision in manufacturing. An optimization criterion may specify one or more desired physical attributes for the manufacturing process. In an embodiment, at least an optimization criterion may assign weights to different attributes or values associated with attributes; weights, as used herein, may be multipliers or other scalar numbers reflecting a relative importance of a particular attribute or value. One or more weights may be expressions of value to designer and/or manufacturer of a particular outcome, attribute value, or other facet of manufacturing process; value may be expressed, as a non-limiting example, in remunerative form, such as a quantity of a medium of exchange, a monetary unit, or the like. As a non-limiting example, minimization of manufacturing time may be multiplied by a first weight, while tolerance above a certain value may be multiplied by a second weight. Optimization criteria may be combined in weighted or unweighted combinations into a function reflecting an overall outcome desired by a user; function may be a cost function to be minimized and/or maximized. Function may be defined by reference to manufacturing constraints and/or weighted aggregation thereof as provided by plurality of manufacturing device 160s; for instance, a cost function combining optimization criteria may seek to minimize or maximize a function of manufacturing constraints.

Continuing to refer to FIG. 1, simulator 136 may be designed and configured to generate at least a simulation of at least a first manufacturing process for manufacturing the part using at least a manufacturer avatar of the plurality of manufacturer avatars 132 as a function of the design of the part; this may be accomplished as described in further detail below. System 100 may include an interrogator. Interrogator may include any hardware module or logic circuitry. Interrogator may be instantiated using one or more commands of computer control logic. In an embodiment, interrogator may be designed and configured to the design to determine at least a geometric feature of the design as described in further detail below. Interrogator may be designed and configured to select a set of orientations for manufacturing at least a feature of the part, as described in further detail below; interrogator may be designed and configured to optimize the set of orientations. Simulator 136 may communicate with interrogator to generate the simulation. In an embodiment, design exchange module may be designed and configured to provide the at least a simulation to a user of a designer client. In an embodiment, manufacturer exchange module 108 may be designed and configured to initiate manufacture of the part as a function of the at least a simulation.

Figure 4:
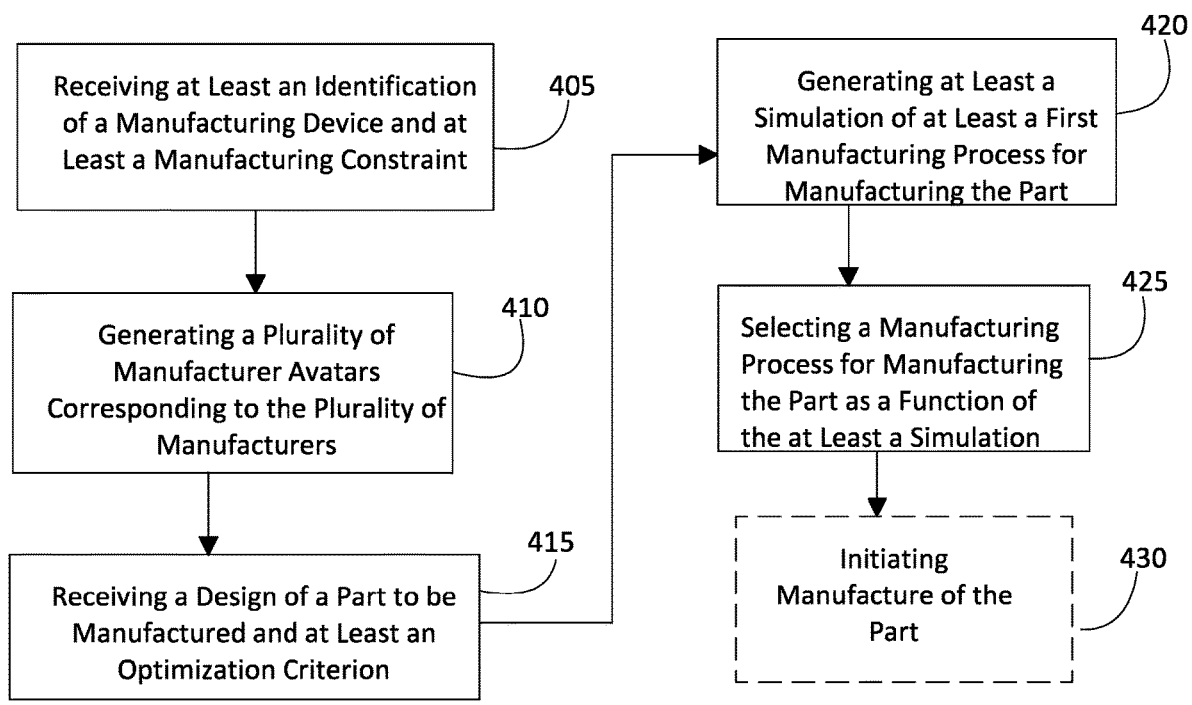
FIG. 4 is a flow diagram illustrated an exemplary method of for secure, oblivious-client optimization of manufacturing processes.

Referring now to FIG. 4, a method 400 of secure, oblivious-client manufacturer optimization is illustrated. At step 405, a manufacturer exchange module 108 executing on a secure server 104 receives at least an identification of a manufacturing device 160 and at least a manufacturing constraint from each of a plurality of manufacturer clients 112*a-n* corresponding to a plurality of manufacturers. Manufacturer exchange module 108 may be a manufacturer exchange module 108 as described above in reference to FIGS. 1-3. At least an identification of a manufacturing device 160 and/or at least a manufacturing constraint may be received using any module, component, or protocol described above in reference to FIG. 103. For instance, at least an identification of a manufacturing device 160 and/or at least a manufacturing constraint may be received by way of cryptographic module 124, according to a secure connection or intercommunication protocol. At least an identification of a manufacturing device 160 and/or at least a manufacturing constraint may be received via manufacturer GUI 116; for instance, a user at a manufacturer of plurality of manufacturers may enter at least an identification of a manufacturing device 160 and/or at least a manufacturing constraint in at least a graphical field. As an illustrative, non-limiting example, user may select a manufacturing device 160 from a drop-down list of manufacturing devices 160; this may be done multiple times, populating a list of manufacturing devices 160. Users skilled in the art will be aware, upon reading the entirety of this disclosure, of various ways in which a user of a GUI such as manufacturer GUI 116 may select entries from provided collection thereof or enter text or other data entries via at least a graphical field.

Still referring to FIG. 4, receiving the at least an identification of the manufacturing device 160 and the at least a manufacturing constraint may include receiving a text entry from a manufacturer client of the plurality of manufacturer clients, and identifying at least a command in a programming language in the text entry. As used herein, a programming language is a formal set of instructions that, when entered on a computing device such as secure server 104, either directly or indirectly configure the computing device, such as secure server 104, to perform one or more sequences of operations; one or more sequences may include one or more sequences of operations the computing device did not perform prior to entry of a given set of instructions. A programing language may include a set of machine-language instructions, which may for instance include a set of instructions in binary, such as "Opcodes" that direct a processor to perform one or more operations the processor is built to perform, such as logical, arithmetic, memory retrieval or writing, shift and/or transposition operations, and the like; it should be noted that binary instructions may be provided to a processor as a temporally or spatially delimited series of voltage levels corresponding to "on" and "off" thresholds in a logic circuit implementing Boolean logic, and that machine language may be represented in an alternative encoding system to binary for processors implementing non-Boolean logic circuits, including without limitation alternative encoding circuits in radices other than 2. A programming language may include an assembly language, which is translated into a set of machine-language instructions as descried above by an assembler or similar program.

A programming language may include a "higher-level" language that is translated into assembly language or another language a particular computing device is configured to receive as instructions using a compiler. A high-level programming language may include an interpreted language, which directly activates at least some high-level instructions by reference to pre-compiled assembly or machine-language instructions corresponding to the high-level instructions. Examples of high-level programming languages include without limitation the PYTHON programming language promulgated by the Python Software Foundation, the JAVA language provided by Oracle Corporation of Redwood Shores, Calif., and the C++ language designed by Bjarne Stroustrup. Persons skilled in the art, upon reading the entirety of this disclosure, will be aware of various programming languages as defined herein, as well as various current and projected syntactic and computational capabilities associated with such languages.

Continuing to view FIG. 4, manufacturing exchange module may convert the at least a command in the programming language into at least an executable command, where an executable command is defined herein as a command in machine language; conversion may be performed by compiling the at least a command, or by activating a pre-compiled set of assembly or machine-language instructions corresponding to the at least a command, as noted above. Manufacturing exchange module may execute at least an executable command. At least an executable command may configure the manufacturer exchange module 108 to define a new variable corresponding to a manufacturing constraint of the at least a manufacturing constraint and populate the new variable with the manufacturing constraint. For instance, where a user of a manufacturer client of the plurality of manufacturer clients 112*a-n* wishes to define a manufacturing constraint in terms of a combination of data not presented in the at least a graphical field, the user may enter one or more commands creating a mathematical or logical relationship between data that may be entered using the at least a graphical field, data to be generated by avatar generator 128 and/or simulator 136, global variables, or constants such as particular numbers; a mathematical or logical relationship may include an algebraic expression combining the data, a conditional statement relating to the data, or any other computation that may be described using a programming language as defined herein.

Still viewing FIG. 4, at least an executable command may configure the manufacturer exchange module 108 to define a new graphical field for accepting a user entry and to display the new graphical field at a display coupled to a manufacturer client of the plurality of manufacturer clients. New graphical field may accept an input to an existing variable, to a new variable created by user, or both. At least an executable command may create a new expression relating one or more variables, which may include variables created by user and/or other variables. At least an executable command may populate an existing variable using a new or existing variable, new or existing expression, and/or new or existing graphical field. At least an executable command may display a user prompt using a new or existing variable, new or existing, expression, or new or existing graphical field. At least an executable command may cause a value to display in an existing graphical field and/or new graphical field; value may be a default value entered as a constant or literal by user, or may be obtained from a new or existing variable, new or existing expression, and/or new or existing graphical field. In an embodiment, at least a user prompt and/or at least a graphical field are also described in programming language; commands in programming language causing at least a graphical field and/or user prompt to display, be populated, or process user entries and/or events may be displayed to user as commands in the programming language, some or all of which a user may be able to modify. Code window 308 may be used to display, accept modifications, or accept new user commands in programming language. Code window 308 may include one or more additional features; for instance, code window may include or be a part of an integrated development environment (IDE), which may provide features to aid in entry of at least a command, including without limitation features such as command suggestions, code completion, warnings, and error checking.

Continuing to view FIG. 4, programming language may be implemented in any number of ways as described above. In an exemplary embodiment, programming language is a domain-specific language (DSL). A DSL, as used herein, is a programming language that is a restricted or otherwise modified version of another programming language, referred to herein as a "base language.". As a non-limiting example, DSL may be a programming language based on Python; the DSL may omit many features of the base language, for the purpose of (1) simplifying the language for ease of usability and/or (2) security. In an embodiment, a purpose of a DSL may be to be expressive for a particular application, where expressiveness may be defined as the ability of a user with domain knowledge to describe a program quickly and with relatively few lines of code. This may permit users to enter any desired combination of commands without the risk of hurting performance of system 100 or accessing data or features that a particular user should not have access to. Features removed, may include, as a non-limiting example, user-defined loop constructs (which could fail to terminate in the worst case) and/or any language feature which gives the base language access to the system 100 and/or secure server 104, directly or indirectly (for example, accessing Python libraries, the filesystem, or other things in memory). Capabilities remaining in DSL may include, without limitation, math functions; for instance, where base language is Python, the DSL may include basic Python math functionality, such as math functions like min, max, floor, ceiling, round and basic numeric operators like "PEMDAS." The use of a DSL may thus provide the user with flexibility in entering information via manufacturer GUI 116, while maintaining security and preventing users from gaining access to unauthorized information.

As a further non-limiting example for illustrative purposes only, and still referring to FIG. 4, programming language may permit a user to make use of one or more data structures, including without limitation objects of an object-oriented language. For instance, and without limitation, a "part" object that exposes all of part attributes of a part to be manufactured, such as without limitation materials, descriptions of one or more geometric features, descriptions of one or more processes applicable to produce part, and the like, as described in further detail below, may be provided; part object may offer one or more member variables and/or functions, including for instance part.runtime, which exposes a part-specific runtime calculated using an avatar as described below. As a further illustrative example, an "options" object may expose options pertaining to manufacture that affect at least a manufacturing constraint such as finishes, quantity, material, and the like; these may or may not have been explicitly chosen by a user. As a further non-limiting example, a "line" function may be provided to permit a user to export a local variable as a line item with a user-specified description, for instance by displaying the variable output; this may aid users in "debugging" user-input commands. As an additional non-limiting example, a "var" function may declare an element of manufacturer GUI 116 permitting a user to specify or change a variable without editing any commands; for example, and without limitation, a user may enter a new value, such as a new labor rate of a shop, which may be incorporated in one or more manufacturing constraints and/or weighted or otherwise combined expressions of one or more manufacturing constraints, using one or more functions or expressions that do not change syntactically or logically upon entry of the modified value.

Continuing to refer to FIG. 4, user-entered instructions may be executed, once converted, may be part of an executable process or function, in which user-entered instructions are executed in a particular order; particular order may be, as a non-limiting example, the order in which the commands display in code window 308. Process or function may have one or more outputs, which may provide to other components or processes within System 100 the at least a manufacturing constraint, one or more weighted, aggregated, or otherwise combined expressions generated using at least a manufacturing constraint, or the like. For instance, an output may communicate a temporal manufacturing constraint, such as lead time, in temporal units such as seconds, hours or days; output may communicate an expression of temporal manufacturing constraints, such as an overall time for manufacture (e.g., as a combination of run times for manufacturing device 160s, lead times, setup times, and the like). Output may represent a weighted combination of other factors, including without limitation weights reflecting values placed on various other constraints, such as multipliers in units of currency; aggregation of weighted values may be communicated, without limitation, as a price or other cost function. User may select number, data type, and/or significance of outputs. Alternatively, outputs may have fixed significance, numbers, and/or data type; system 100 may require one or more outputs to be populated.

At step 410, and still referring to FIG. 4, a plurality of manufacturer avatars 132 is generated. This may be implemented by avatar generator 128 as described above in reference to FIGS. 1-3. Plurality of manufacturer avatars 132 correspond to a plurality of manufacturers; in other words, each manufacturer avatar of plurality of manufacturer avatars 132 corresponds to a manufacturer, branch or manufacturing floor of a manufacturer, bank of manufacturing device 160s, or a manufacturing device 160, as described in further detail above. Generating each manufacturer avatar of the plurality of manufacturer avatars 132 may include providing a unique manufacturer identifier. Unique manufacturer identifier may be a locally unique identifier; that is, it may uniquely identify manufacturer within system 100, corresponding only to one or more manufacturer avatars associated with that manufacturer. More generally unique identifiers may be used, including without limitation globally unique identifiers (GUIDs) or universally unique identifiers (UUIDs). Generating may include generating as a function of the identification of the at least a manufacturing device 160 and the at least a manufacture constraint. Each manufacturer avatar, for instance, may include a manufacturer identifier unique to the corresponding manufacturer for the manufacturer avatar. Each manufacturer avatar may have one or more elements usable to simulate results of manufacturing a given part at the corresponding manufacturer where the manufacturer avatar is an avatar of a manufacturer, branch where the manufacturer avatar is an avatar of a branch, factory floor where the manufacturer avatar is an avatar of a factory floor, bank of manufacturing device 160s where the manufacturer avatar is an avatar of a bank of manufacturing device 160s, or manufacturing device 160 where the manufacturer avatar is an avatar of a manufacturing device 160. Manufacturer avatars may be built by combining other manufacturer avatars; for instance, a manufacturer avatar corresponding to each manufacturing device 160 identified as being present at a given manufacturer may be generated and combined into one or more avatars identifier banks of manufacturing device 160s, factory floors, branches, or the manufacturer itself. Generating may include duplicating one or more manufacturer avatars; for instance, if the identification of at least a manufacturing device 160 identifies a manufacturing device 160 or type of manufacturing device 160 for which a manufacturer avatar has been generated previously, a duplicate thereof may be incorporated in a new manufacturer avatar generated for a manufacturer furnishing the identification.

With continued reference to FIG. 4, generating each manufacturer avatar of the plurality of manufacturer avatars 132 may include calculating a plurality of dependencies on at least a design attribute; plurality of dependencies may include, for instance, temporal dependencies. As used herein, a dependency is a mathematical or logical relationship between at least a design attribute and an attribute of a manufacturing process to produce the at least a design attribute; for instance, a dependency may relate a particular geometric feature, as produced by a particular manufacturing device 160 represented by a manufacturer avatar, to an amount of runtime necessary for producing that feature at the particular manufacturing device 160. At least a design attribute may include at least a workpiece orientation; at least a workpiece orientation may include a plurality of orientations, which may relate to a corresponding number of "setups" or re-orientations of a workpiece in reference to a manufacturing device 160. At least a design attribute may include a geometric feature. A dependency may depend on one or more categories of design attributes; for instance, a temporal dependency may describe time necessary to produce a particular geometric feature from a particular orientation, or in other words, dependency on feature geometry may depend on workpiece orientation. This may be the case where, for instance, a CNC machine is forming a given feature: the feature may be more rapidly formed with a given milling tool from one angle than from another; as noted below, forming a particular feature from an orientation that causes feature formation to take longer may enable simulator 136 to select a smaller number of orientations, which may produce an overall faster manufacturing time for a given feature. Calculating plurality of dependencies may involve calculating at least a dependency regarding manufacture using a first material, and using the at least dependency.

Continuing to refer to FIG. 4, calculating the plurality of dependencies may include generating at least a heuristic estimating a dependency on the at least a design attribute. As used herein, the heuristic is relationship between at least a design attribute and a manufacturing attribute that estimates the latter based on the former without a brute-force calculation such as time-step simulation. For instance, and without limitation, where the dependency is a temporal dependency between geometric features and a runtime to manufacture the geometric features, a brute-force technique for calculating the dependency may be determining toolpaths to manufacture each feature of design, on a CNC machine, running a "slicer" to determine the runtime for building an object having each feature on an additive manufacturing device 160, or the like; a heuristic in this case may be a polynomial equation, such as without limitation a linear equation, in which the variables describe the geometric features and the output is a runtime to generate the features. Other variables may represent "engineered features" defined herein as numerical values derived from the geometry (as described by a data structure) using formulas or algorithms devised by someone knowledgeable of a particular manufacturing process in an attempt to create a value or metric that will correlate with runtime or other temporal aspects of a manufacturing process. In an embodiment, using at least a heuristic to simulate manufacture may drastically reduce the time needed to perform the simulation, while sacrificing relatively little accuracy; for example heuristic estimation of runtime may be several factors of ten faster than the above-described brute force approaches. In other embodiments, a heuristics may include a heuristic based on a single variable or a small set of variables, such as applying a material deposition or removal rate, such that the part's volume is divided by said rate to estimate runtime.

Still referring to FIG. 4, generating the at least a heuristic may involve receiving data describing at least an actual manufacturing process of at least a part from at least a design. Data describing at least an actual manufacturing process may include at least a design of the part produced in the actual manufacturing process. At least a design may include any design as described above, including without limitation any graphical model of a part as described above in reference to FIGS. 1-3. At least a design may include some number of features; for instance, designs of at least a design may be chosen to exhibit a set of features requiring a large proportion of capabilities of a given manufacturing device 160, enabling use of the at least a design to predict manufacturing runtimes or other attributes of manufacturing processes for a wide range of features. Data describing at least an actual manufacturing process may include runtime information; for instance data may describe the runtime used to manufacture a given part represented in a design of at least a design. Avatar generator 128 may relate the data describing the at least an actual manufacturing process to at least a first attribute of the at least a design. For instance, avatar generator 128 may generate a list of features and produce an equation relating each feature to runtime, enabling prediction of runtime from an enumeration of features of a part in an additional design. The at least a heuristic may be generated as a function of the data describing the at least an actual manufacturing process to the at least a first attribute; this may be performed, for instance, by analyzing two or more parts having a common feature, and comparing runtimes to generate a runtime corresponding to that feature. Features may be selected automatically, for instance by identifying, with reference to interrogator, one or more features frequently found in design files and/or one or more features having a statistically significant relationship to runtimes. Alternatively or additionally, a user may identify one or more features for simulator 136 to track; for instance, a user may identify holes, based on a known relationship between holes and runtimes in a CNC machine. Features for simulator 136 to track may similarly include without limitation faces that may be surfaced, for instance by an end mill, faces that may be profile-cut, and/or large portions of volume removal. In an embodiment, a heuristic may be generated using machine learning. At least a machine learning technique may be used to estimate runtime using one or more variables. At least a machine learning technique may include, without limitation, linear regression using ordinary least squares, support vector regression, multivariate adaptive regression splines (MARS), polynomial regression, stepwise regression, and/or other techniques that will be apparent to those skilled in the art of machine learning upon reading the entirety of this disclosure.

In an embodiment, and still viewing FIG. 4, generating at least a heuristic may include use of alternative or additional artificial intelligence methods. For instance, and without limitation, artificial intelligence methods may be used to determine key constraints of a manufacturing process, such as number of setups, runtime, and/or other dependencies, including temporal dependencies, that may be represented by at least a heuristic. Artificial intelligence may include use of machine learning processes including without limitation machine learning techniques as described above. Alternatively or additionally, artificial intelligence may be deployed by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. For the purposes of estimating manufacturing process constraints, given a three-dimensional model containing a design to be manufactured as described above, the input three-dimensional design may first be voxelized using arbitrary voxel size. If the design represented in the three-dimensional model fills more than half of a voxel, that voxel may be considered "filled" and takes on a value of 1; if the voxel is less than half filled by the three-dimensional model, the value 0 may be used. Each voxel may then connected to an input node in the neural network. The output nodes may correspond to desired constraints or relations, such as relations to be represented by at least a heuristic, to be simulated. This network may be trained using a large dataset of design files, such as those used in machine learning processes as described above; each design file may be labeled with known "truth" data for the constraints and/or relations to be estimated for derivation of at least a heuristic. The trained network may then be used to apply constraints, relations, and/or heuristics so derived to simulate one manufacturing processes, as performed by one or more manufacturing devices, for a new design that has not previously been seen by the network. Artificial neural networks may produce results more quickly or more accurately than a time-step simulation.

Continuing to refer to FIG. 4, data describing actual manufacturing process may be provided in any of various ways. As a non-limiting example, data may be provided by recording attributes of a manufacturing process that is performed at one of plurality of manufacturers; in some embodiments, where a manufacturing process is initiated by system 100 as described in further detail below, or where a manufacturing process is initiated in response to generation and/or selection of a manufacturer or manufacturing process pursuant to methods described herein, a manufacturer client of plurality of manufacturer clients may send data describing the actual manufacturing process to secure server 104, thus adding to a growing body of such data for system 100 to use. Data describing actual manufacturing processes may be obtained from additional parties, based on recording of data during manufacture. Alternatively or additionally, data describing actual manufacturing processes may be produced using brute-force predictive methods; for instance, a program that generates toolpaths to manufacture a given part subtractively may produce a highly accurate prediction of runtime to produce that part, which may be used as data describing an actual manufacturing process. Similarly, a "slicer" may be used to effectively (albeit slowly) describe the time necessary to construct a given part described in a design additively, allowing the resulting information to be used as data describing an actual manufacturing process.

With continuing reference to FIG. 4, calculating the plurality of dependencies may include receiving an avatar of a first manufacturer at the server. Avatar of first manufacturer may include an avatar of entire first manufacturer, or of any portion thereof; for instance, and without limitation, avatar of first manufacturer may include an avatar of a first manufacturing device 160 used by first manufacturer. Avatar of first manufacturer may be an avatar of any manufacturing device 160 as described above, whether generated with regard to an actual manufacturer or not. Avatar of first manufacturer may be generated using any processes described above. Calculating the plurality of dependencies may include receiving data describing at least an actual manufacturing process at a second manufacturing device 160, wherein the second manufacturer is distinct from the first manufacturer at the server; where avatar of first manufacture represents a manufacturing device 160, second manufacturer may be distinct from first manufacture where second manufacture is a second manufacturing device 160 distinct from first manufacturing device 160, even if both are used by the same manufacturer. Data describing at least an actual manufacturing process at second manufacturer may be produced or acquired by any means or processes described above for obtaining such data; data describing at least an actual manufacturing process at second manufacturer may include any information described above for data describing at least an actual manufacturing process. Calculating the plurality of dependencies may include calculating the plurality of dependencies as a function of the avatar of the first manufacturer and the data describing at least an actual manufacturing process at second manufacturer, where the plurality of dependencies includes a plurality of dependencies for the second manufacturer. This may be performed, for instance, by comparing a heuristic from the avatar of the first manufacturer to data describing at least an actual manufacturing process at second manufacturer, computing an error function describing the differences between predictions from the heuristic and attributes of data describing at least an actual manufacturing process at second manufacturer, and modifying the heuristic to minimize the error function. This may be performed using a polynomial regression process, such as a linear regression process.

As a non-limiting example, and still referring to FIG. 4, first manufacturer avatar may be created for a particular manufacturing device 160 belonging to a category of manufacturing device 160s; for instance, a single fused deposition modeling device might be chosen for creating the first manufacturer avatar for additive manufacturing device 160s. After creation of the first manufacturer avatar, a plurality of second manufacturer avatars of manufacturing device 160s belonging to the category may be created using the above-described process. In an embodiment, a degree of difference between first device and second device may be determined; for instance, a where the first manufacturing avatar is an avatar of a fused deposition modeling device, the degree of difference to another fused deposition modeling device may be small. As a result, system 100 may use data describing only a few actual manufacturing processes to produce second avatar from first avatar. Where the second device is a power-binder three-dimensional printer or a stereolithographic device, the degree of difference may be greater, and data describing a greater number of actual manufacturing processes may be used. This assessment of degree of difference may be used, for instance, to select an initial set of data for performing a regression, prior to a testing or error-function assessment stage as described above. Regression may be chosen with regard to one or more features of a manufacturing process. As a non-limiting example, for additive devices, the regression may be performed regarding runtime, support volume, part height, and part volume.

At step 415, and with continued reference to FIG. 4, a design of a part to be manufactured using an automated manufacturing device 160 and at least an optimization criterion is received. Design and/or optimization criterion may be received in any suitable way. In some embodiments, design and/or optimization criterion is developed at secure server 104; for example, design may be generated using computer modeling software such as CAD software or the like. Design and/or optimization criterion may be provided via designer exchange module 140. For instance, and without limitation, a designer client of plurality of designer clients 144a-n may upload design and/or optimization criterion to secure server 104 via design exchange module. Alternatively or additionally a user of a designer client of plurality of designer clients 144a-n may enter one or more instructions via designer GUI 148; one or more instructions may include information describing at least an optimization criterion, or one or more instructions to build design in modeling software operated on secure server 104. At least an optimization criterion and/or design may be received from remote device 152.

Still referring to FIG. 4, at least an optimization criterion may be entered directly or indirectly. For instance, where a user of a designer client of plurality of designer clients 144a-n wishes to minimize runtime or lead time, the user may enter an optimization criterion minimizing run time or lead time; graphical fields may permit a user to select a manufacturing process attribute such as run time or lead time and to enter an instruction to maximize or minimize that attribute. As a further example, a user may wish to minimize overall production time; overall production time may be a function of lead time and run time, and thus may be expressed as a relation between two optimization criteria, where a graphical field may enable the user to describe the function to be minimized (overall production time), indirectly specifying the optimization criteria in question. Function of optimization criteria may include one or more weights to be applied to optimization criteria; one or more weights may represent a value placed on one or more optimization criteria by a designer and/or a manufacturer. As a non-limiting example, one or more weights may be represented in remunerative form, describing values in currency to be applied, for instance, to runtime, materials, setup time, and the like. Functions of optimization criteria may similarly be created, displayed to user, and/or selected by user; as a non-limiting example, user may be able to select a function representing total price to manufacture the part represented in design. User may be able to specify a desired maximal or minimal amount for any optimization criterion or function of optimization criteria. User may be able to request that any optimization criterion or function of optimization criteria be maximized or minimized. User may specify additional requirements for manufacture, such as numbers of parts to be manufactured for a given part design.

At step 420, at least a simulation of at least a first manufacturing process for manufacturing the part using a first manufacturer avatar of the plurality of manufacturer avatars 132 is generated as a function of the design of the part. This may be performed, for instance, using at least a dependency of a manufacturing attribute on a feature of design; at least a dependency may include at least a heuristic as described above. At least a dependency may include at least a temporal dependency. Generating the at least a simulation may include interrogating the design to determine at least a geometric feature of the design. At least a geometric feature may include one or more surface features, including regular or irregular polyhedral surfaces, curved surfaces, flat surfaces, or combinations thereof; surfaces may be concave or convex. At least a geometric feature may include one or more holes, recesses, or cavities; cavities may have exterior openings or may be enclosed; for instance, an additive manufacturing process may be useable to produce an enclosed cavity. Holes may include holes for bolts or other fasteners. Interrogation may function by, for instance, comparing one or more surfaces and/or combinations thereof to geometric primitives or to geometric features stored in one or more databases. Generation of at least a simulation may be performed by generating one or more toolpaths for CNC machining, machine-control instructions directing the operation of any automated manufacturing device, programming instructions, such as "gcode," directing an automated manufacturing device to take steps such as moving, depositing material, removing material with a tool, and the like. One or more toolpaths, machine-control instructions, programming instructions, or other similar simulation output or information may be conveyed to a user, manufacturer or other entity; a recipient may save the output for later use, utilize the output to operate a manufacturing device, and/or compare to machine-control instructions, toolpaths, or programming instructions generated elsewhere to identify preferred or optimal processes to perform. As noted above, any simulation generation, including without limitation generation of toolpaths, machine-control instructions, or programming instructions, may be performed on any machine architecture, including in the cloud, via one or more parallel computing processes using one or more devices, or any other configuration suitable for use as secure server 104, as described above. A third-party device may be used to generate toolpaths, machine-control instructions, and/or programming instructions.

With continued reference to FIG. 4, generating at least a simulation may include generating as a function of one or more materials from which the part may be manufactured; one or more materials may be specified in design. For example, and without limitation, design may specify one or more categories of materials or one or more specific materials from which part may be manufactured. Design may specify one or more materials not to use to manufacture part or component of part; for instance, part may be designed to be exposed to a corrosive environment, and design may specify that the part cannot be made of one or more materials that corrode easily, such as certain metals. Where design does not specify materials to use or not to use in making design, interrogator may determine from other factors in design which materials are usable or not usable to make design. As a non-limiting example, design may specify one or more manufacturing methods that may be used to manufacture part; interrogator may eliminate materials for creating design by determining that the eliminated materials are incompatible with the one or more manufacturing methods. As an example, where design specifies a category of CNC milling that cannot machine tungsten carbide, interrogator may eliminate tungsten carbide as a possible material. Design may have a form that limits the manufacturing process that may produce design; for instance, a design may include an enclosed internal cavity or void, eliminating CNC machining as a process for manufacturing design. Design may specify at least a physical attribute of part, such as density, hardness, tensile strength, heat resistance, or the like; interrogator may select potential materials for part based on the at least a physical attribute. Design may similarly specify how quickly simulations should be generated. Interrogator may determine a manufacturing process as a function of physical attributes and/or included or excluded materials.

Still referring to FIG. 4, interrogator may select at least a manufacturing avatar, of the plurality of manufacturer avatars 132, representing a manufacturer and/or manufacturer device capable of manufacturing the part. Interrogator may select a manufacturing device 160 from plurality of manufacturer avatars 132 as a function of the at least a manufacturing constraint; for instance, where a given manufacturer has provided a manufacturing constraint indicating that the manufacturer cannot or will not perform a particular process or category of processes, and interrogator has determined that the particular process or category of processes is necessary to manufacture the part, interrogator may eliminate at least a manufacturer avatar corresponding to that manufacturer.

Continuing to view FIG. 4, generating the at least a simulation may include selecting a set of orientations for manufacturing the at least a feature. Set of orientations may include one orientation or a plurality of orientations. How many orientations are in the set of orientations may depend on various determinations performed by interrogator while interrogating design. For instance, where interrogator has determined that a manufacturing device 160 that may manufacture design is an additive manufacturing device 160, set of orientations may include a single orientation, based on, e.g., an assumption that the entire part may be constructed in a single printing session while mounted on a substrate; alternatively, more than one orientation may be selected for a part that may be printed in part from one orientation, shifted to a different position, and then added to for additional details from a second angle.

Still viewing FIG. 4, as another non-limiting example, where interrogator determines that part may be manufactured using a subtractive manufacturing device 160, such as a CNC machine, set of orientations may include a set of orientations sufficient to machine each surface of part from a precursor or workpiece. Determining a sufficient set of orientations may be performed in any suitable manner, including without limitation analyzing face connectivity, computer vision techniques, ray casting, or computing the local Euler characteristic. As a non-limiting example, consider a typical part designed for manufacture by a three-axis CNC machining process, oriented in a 3D coordinate system such that the Z dimension corresponds to shortest axis. Part may be machined from a block (i.e., rectangular prism) workpiece whose dimensions are at least as large as the part's bounding box. Continuing the example, part may be designed for efficient manufacture, and may have contoured faces to be machined along the two planes of the workpiece parallel to the coordinate system's XY plane.; part may have faces that lie on the workpiece's four planes that are parallel to the XZ and YZ planes. Design may call for faces that may be drilled along the X, Y or Z axis through any face or faces. Still continuing the example interrogator may analyze part in design to determine if it is suitable for efficient three-axis CNC machine manufacture, and, if so, to determine the set of orientations from which the part must be machined. In an embodiment, interrogator may consider each face of part as described in design. If a face's normal vector has a positive component in the Z direction, interrogator may project a virtual shape from that face upward to the extent of the part's bounding box. Interrogator may further perform a boolean operation between the part and that virtual shape to determine whether the virtual shape and the part have any intersection. Those skilled in the art of analyzing 3D geometries using design files and/or software, including without limitation CAD software, will recognize upon reviewing the entirety of this disclosure how to accomplish these operations programmatically. If there is no intersection, interrogator may determine that face in question must be machined from the positive Z direction. If the face instead has a normal vector with a negative Z component, interrogator may project virtual shape downward toward the minimum Z plane of the bounding box and repeat the Boolean operation. If there is no intersection, interrogator may determine that face in question must be machined from the negative Z direction. Additional orientations may be determined by analyzing drilled holes as described by concave cylindrical faces listed in design. Each cylinder may have an axis described by a 3-vector that describes its center. Set of distinct hole axes may represent the additional required orientations (in addition to the positive Z, negative Z, or both, as determined previously). Persons skilled in the art, upon reviewing the entirety of this disclosure, may be aware of additional or alternative approaches that may be taken to select an orientation set for subtractive and/or additive processes consistently with this disclosure.

With continued reference to FIG. 4, where interrogator has determined that part may be manufactured by some categories of manufacturing device 160, determination of set of orientations may include selection of a default orientation. For instance, where interrogator has determined that part is a flat part, orientation may be an orientation in which blanks or sheets of flat material are placed in manufacturing device 160s to form flat parts. Similarly, where interrogator has determined that part may be formed by molding, set of orientations may include an orientation of a mold. Orientations may also describe orientations for finishing or touching up a part, such as by polishing, removing imperfections such as seams or other projections created in the molding process, and the like.

Still referring to FIG. 4, selection of set of orientations may also be used as part of determining whether a given manufacturing device 160 and/or manufacturer can manufacture part. For instance, where a subtractive manufacturing device 160 was initially selected as capable of manufacturing part, selection of set of orientations may reveal that there is at least a surface that the manufacturing device 160 cannot manufacture; manufacturing device 160 may be eliminated from a list or other data structure representing manufacturing device 160s to manufacture part as a result.

With continued reference to FIG. 4, selection of set of orientations may include selecting a number of setups, where setups are defined as initial configuration of a manufacturing device 160. For instance, a setup may involve placing a workpiece at a base table or similar support structure of a manufacturing device 160 and locating the workpiece relative to a manufacturing tool 204 so that a computing device guiding the manufacturing process is able to locate features of the workpiece and/or part precisely according to a coordinate system. Selection of a set of orientations may involve selection or identification of one or more support structures necessary to support a workpiece and/or part at a given angle, including without limitation custom fixtures or other items. Selecting a set of orientations may include selecting a plurality of orientations achievable with a single setup; for instance, a manufacturing device 160 for which the plurality of orientations is selected may have a rotary table, trunnion table, or other mobile support structure able to rotate or move a workpiece from one orientation to another, relative to a manufacturing tool 204.

Still referring to FIG. 4, generating at least a simulation may include simulating at least a first manufacturing process as a function of at least a geometric feature. As a non-limiting example, generating at least a simulation may include matching at least a geometric feature to at least a dependency relating to at least a feature, as described above; at least a dependency may include a temporal dependency. At least a dependency may include a heuristic. Generating at least a simulation may include simulating at least a first manufacturing process as a function of set of orientations. As a non-limiting example, generating at least a simulation may include matching at least a geometric feature to at least a dependency relating to at least a feature, as described above; at least a dependency may include a temporal dependency. At least a dependency may include at least a heuristic. Generating at least a simulation may include simulating at least a first manufacturing process as a function of set of orientations and at least a geometric feature. As a non-limiting example, generating at least a simulation may include matching at least a geometric feature at an orientation of set of orientations to at least a dependency relating to at least a feature, as described above; at least a dependency may include a temporal dependency. At least a dependency may include at least a heuristic.

Continuing to refer to FIG. 4, generating at least a simulation may include generating at least a simulation as a function of at least an optimization criterion. For instance, where at least an optimization criterion includes a material or set of materials a user of designer client has specified for constructing part, simulator 136 may generate simulation using at least a dependency relating to the specified material or set of materials; as a non-limiting example, at least a dependency may relate runtime of a manufacturing device 160 to a material or material characteristic, such as relating less machinable or harder materials to a more extensive runtime. As another example, at least an optimization criterion may include one or more physical characteristics intended for part, which simulator 136 may use to select at least a dependency relating to a material having such characteristics. In an embodiment, at least a heuristic may be used to select a set of combinations of options regarding choice of manufacturer avatar and/or manufacturing choices that are likely to produce optimal results according to at least an optimization criterion and/or a function thereof. As a non-limiting example, manufacturers may be selected for simulation according to a heuristic based on average lead time from previous simulations, average past runtime, or the like, either by elimination of manufacturers having lead times and/or run times above or below a given threshold value, or by ranking of manufacturers by lead times and/or run times and selecting some pre-determined number of the highest-ranking manufacturers according to that ranking. As another example, simulations may be run for a small number of materials based on a set of most popular materials in each class of materials; for instance, by selecting acrylonitrile butadiene styrene (ABS) as a polymer and aluminum as a metal. As a further non-limiting example, finishing options may be omitted from simulations where time constraints or costs are to be minimized. As still another non-limiting example, simulations for a given manufacturer or manufacturing facility may be run only regarding in-stock materials and/or operational equipment at that manufacturer or manufacturing facility.

With continued reference to FIG. 4, simulations may be run for manufacturing a part that may be manufactured in a series of distinct processes and/or processes using distinct manufacturing devices. Series of distinct processes may be necessary to manufacture a particular design using manufacturing devices that exist at the time of simulation; for instance, a part formed by additive and/or subtractive processes may be formed according to a design that also requires a particular surface coating that is only possible in a particular device that does not perform the additive and/or subtractive processes. As another example, for some designs, a particular step will be performable only on a particular kind of manufacturing devices, such as some tolerances for features called for in a design that may be manufacturable only on subtractive devices given existent technology at the time of simulation, but other steps may be performable in a number of distinct ways; for instance, the remainder of the design having the above-described tolerance requirements may be realizable using the same subtractive manufacturing device, or some steps may be equally well performed by a lathe, wire EDM device, mold, or additive manufacturing device. Other designs may be manufacturable using various different potential combinations of processes and devices, such as a part that could be made equally well with additive processes, subtractive processes, molds, or some combination thereof.

Still referring to FIG. 4, at least a simulation may account for designs that either require or are possible to manufacture using various combinations of machines. At least a simulation may include one or more compositions of simulations simulating one or more compositions of manufacturing processes, where "composition" is used in the mathematical sense of a first function or process performed on an output of a second function, with which the first function is said to be "composed." A composition of simulations may, as a non-limiting example, include a first simulation for performing a first set of steps usable to manufacture a part or product represented in the design from a given state of a precursor or workpiece for the part or product and producing a workpiece or precursor having some features formed or steps performed to produce the part or product; the composition may include a second simulation beginning with the output of the first simulation and producing a second output in which additional steps have been performed or features formed, and which may be the completed part or product, or may be another partially completed part workpiece, or precursor.

In an embodiment, and still viewing FIG. 4, finding an optimal or nearly optimal composition of manufacturing processes may be incredibly computationally complex to solve via simulation due to the staggering number of possible ways to combine a large number of processes. Therefore, heuristics may be employed to simulate common combinations of processes used by those skilled in the art of manufacturing. For example, and without limitation, a wire EDM may be used remove parts of a source material prior to milling. In another example, a CNC mill may be used to add holes or faces to a part that could otherwise be completed by a lathe. These composition of processes may produce a more optimal result than any single process capable of producing the geometry. For example, a combination of lathe and mill may produce a part with more desirable mechanical properties than 3D printing the same geometry. In an embodiment, a near-optimal composition may be arrived at using a sequence of locally optimal solutions; for instance, where manufacture requires a certain volume of material be added or removed, a first process may be selected that adds or removes a maximal amount of material in an optimal fashion. For instance, lathe or wire EDM material removal may rapidly and/or cost-effectively remove a large amount of material quickly, and thus may be selected as a first step. A subsequent material-removal step may call for removal of material according to more detailed features, rendering wire EDM and/or lathe use impractical and making CNC machining locally optimal for a subsequent material removal step. Similarly, a first additive process having grosser details and/or a process molding material into a geometric primitive that may be contained within a design to be constructed additively, or that may contain the design, may be selected for rapidly adding material, as a locally optimal first step, to be followed by a subsequent locally optimal step involving adding additional details with a finer additive device and/or machining additional details using a CNC machine. Persons skilled in the art, upon reading the entirety of this disclosure, may be aware of various ways in which this optimization may be performed consistently with the above-described considerations.

Continuing to refer to FIG. 4, at least a simulation may account for an ability to manufacture multiple parts together in a single iteration of a manufacturing process. For instance, additive manufacturing processes may be used simultaneously to construct more than one part at a time where the parts to be constructed fit on or in the device; as a non-limiting example simulator and/or interrogator may determine that the "bounding box" of a part is less half of the area in which the part could be additively manufacture on a particular additive device, permitting two or more instances of the part to be manufactured simultaneously. Similarly, any number of different or identical parts having bounding boxes and/or bounding box footprints fitting together on or in additive manufacturing device may be manufactured in the same additive process. Multiple parts to be subtractively manufactured may also be manufactured in the same process; for instance, where bounding boxes of parts can be fit into the area of a slab of material or other precursor to be machined or otherwise subtractively manufactured to produce those parts, a subtractive device may be programmed to machine multiple parts from a single workpiece. At least a simulation may determine runtimes and lead times, parameters depending on either runtimes or lead times, and other factors such as feasibility or availability of manufacturing devices, with the assumption that multiple parts may be simultaneously manufactured, either in entirety or for at least a stage of each part's respective manufacturing procedure; simulation may, for instance, reduce the runtime per part where multiple parts may be manufactured simultaneously. Simulation may reduce support volume requirements based on multiple parts' abilities to support one another; for instance two parts having slanted surfaces may be additively manufactured together with one inverted, such that one slanted surface is supported above the other with only a small support volume. Persons skilled in the art, upon reviewing the entirety of this disclosure, will be aware of various ways in which an ability to manufacture multiple parts in a single manufacturing process may modify and/or improve various parameters of a manufacturing process.

With continued reference to FIG. 4, simulator 136 may filter at least a simulation according to at least an optimization criterion. For instance, at least an optimization criterion may place an upper limit on runtime or weighted runtime as alluded to above; simulator 136 may generate a plurality of simulations and then eliminate one or more simulations having a runtime exceeding the maximal runtime specified by the optimization criterion.

Still referring to FIG. 4, in an embodiment, simulator 136 generates different simulations with different optimization criteria of at least an optimization criterion. In other words, part of simulation may involve simulation for many permutations of options, each of which may result in a different simulated manufacturing process having a different result relative to at least an optimization constraint. For instance, simulator 136 may generate at least a first simulation for a first set of optimization criteria of at least an optimization criterion and generate at least a second simulation for a second set of optimization criteria of at least an optimization criterion. Simulator 136 may alternatively or additionally generate a plurality of simulations using a plurality of different manufacturer avatars; for instance, simulator 136 may generate at least a first simulation using at least a first manufacturer avatar and at least a second simulation using at least a second manufacturer avatar. At least a simulator 136 may generate various simulations using different combinations of optimization criteria and manufacturer avatars; persons skilled in the art, upon reading the entirety of this disclosure, will be aware of numerous ways in which optimization criteria and/or manufacturer avatars may be combined to produce various simulations as described herein. In an embodiment, at least a first simulation and at least a second simulation are each provided to a user of designer client, permitting the user to make an informed choice based on different optimization criteria. Alternatively or additionally, at least a first simulation and at least a second simulation may be ranked according to a function of at least an optimization criterion; function may be an optimization criterion a user of a designer client has specified, a weighted combination of optimization criteria either directly or indirectly specified by user, and/or any other function of optimization criteria and/or manufacturing constraints as specified above. Alternatively or additionally, simulator 136 may filter by a function of optimization criteria, which may be similarly defined or specified.

At step 425, manufacturing process for manufacturing the part is selected as a function of the at least a simulation and the optimization criterion. This may be performed by presenting at least a simulation to a user and receiving a user selection of at least a simulation. Where generating the simulation includes generating a plurality of simulations, selection of the manufacturing process may include determining a degree of optimization according to the at least an optimization criterion for each simulation of the plurality of simulations; degree of optimization may be determined regarding one or more optimization criteria directly, one or more weighted optimization criteria, and/or one or more functions of weighted or unweighted optimization criteria as described above. Plurality of simulations may be filtered; this may be performed according to any process described above for ranking and/or filtering simulations. Filtering process may be used to select a simulation automatically, for instance by choosing only the highest ranking simulation as ranked above, by iteratively filtering to reduce the number of simulations to one, or the like. In an embodiment, automatic selection is combined with presentation to a user; for instance an automatically selected simulation may be provided to the user in conjunction with a plurality of optimizations, which may be ranked and/or filtered as described above.

Still viewing FIG. 4, presentation to user may include presentation according to one or more criteria or options; for instance, where simulation results may vary as against at least an optimization criterion and/or a function thereof according to some variable attribute of manufacturing process, such as number of parts per batch, a physical characteristic or material, a lead time, or the like, the range of the variation of simulation results may be presented to the user, for instance in a graphical format, which may, as a non-limiting example, plot values of simulations as pertaining to one or more optimization criteria and/or functions thereof against values of at least a variable, producing a curve in two or more dimensions. In an embodiment, a set of simulations may be executed for all or many permutations of options and/or avatars to "search the space" for optimal manufacturing solutions based on constraints and priorities. An initial set of simulations may be run based on constraints and/or optimization criteria, using any or all processes for selection of sets of simulations described herein. A designer, or user of a designer client, may observe the resulting simulations, and modify optimization criteria and/or other inputs; as a result, additional simulations may be generated and provided to designer according to any process described herein for provision of simulations to a designer. This process of revision and regeneration of simulations may be performed repeatedly, forming a feedback loop, until an optimal result is achieved or until a sufficiently close to optimal result is achieved.

With continued reference to FIG. 4, in an embodiment the above-described feedback process may be incorporated in a "lazy loading" or "call-when-needed" protocol. For instance, an initial set of simulations may be performed to cover a "first guess" at a user's probable needs; the first guess may include optimization criteria and/or one or more heuristics based thereon. As a non-limiting example, an initial heuristic may include a ranking of manufacturers and/or manufacturing devices according to lead time, runtime, affordability, or door-to-door delivery time of completed projects, assuming typical manufacturing needs and/or optimization criteria; heuristic may include selecting some number of highest-ranking manufacturers and/or devices and performing simulations using related avatars. Ranking may be further weighted or filtered by a user's geographical region, proximity of a given manufacturer to a material supplier providing materials needed for the project, or the like. Simulations performed using the initial heuristic may be provided to the user directly, rather than performance and ranking of all possible simulations with all possible avatars; user may, upon review of these initial results, provide additional or further refined optimization criteria, and simulator may run a second set of simulations. Second set may modify heuristic by reference to a stored ranking of manufacturers and/or manufacturing devices that better fits newly entered criteria; alternatively or additionally, a full set of simulations may be performed and/or ranked after user has entered additional or refining optimization criteria. User may indicate that optimization criteria as last entered reflect the user's final selection, for instance, triggering a complete run of simulations. Alternatively, simulator may continue providing "best match" heuristic simulation selections to user until arriving at a likely optimal solution, as identified either by the system or by user acquiescence.

Continuing to refer to FIG. 4, optimization may include choosing compositions of processes and/or simulations. For instance, where a part is to be manufactured subtractively, certain features may require the use of a CNC machine or the like for tolerances or fine details, but a CNC machine may be time-consuming or expensive way to remove larger quantities of material; in that case, a wire EDM process, laser cutting process, water-cutting process, lathe-based process, or the like may be used to cut away excess material or otherwise perform some initial material removal processes much more rapidly and/or cost-effectively. Simulator 136 may generate simulations of various potential combinations of manufacturing stages to meet at least an optimization criterion. In addition to dependencies corresponding to particular manufacturer avatars' production of particular features, simulator 136 may determine one or more factors affecting avatars' combined performances as affecting at least an optimization criterion. For instance, where a first two manufacturers are located a large distance apart geographically, overall time to manufacture the part may be longer than that presented by a second two manufacturers that are closer together, even where the first two manufacturers' overall runtime is faster, owing to time needed for transport. Costs may similarly be affected by shipping. Overall manufacture time may also be affected by one or more manufacturers' lead times; for instance, a workpiece that has been manufactured at one stage may spend a substantial amount of time sitting at a subsequent manufacturer or manufacturing device prior to completion of a second stage. A manufacturer avatar representing a manufacturer that includes several different manufacturing devices may, in an embodiment, have an advantage regarding a multistage process, owing to the lack of need for shipping, for instance, given an optimization criterion relating to overall manufacturing time. Persons skilled in the art, upon reviewing the entirety of this disclosure, will be aware of various optimal combinations of the above-described stages and/or multistage processes depending on particular optimization criteria.

With continued reference to FIG. 4, optimization process may account for an ability to manufacture two or more parts in the same manufacturing process, such as two or parts produced in a single additive process or machining process as described above. For the purposes of clarity, but without limitation regarding additional variations or sub-combinations, multi-part manufacture may be classified generally into simultaneous manufacture of multiple parts for a single designer or multiple parts for two or more distinct designers. In the former case, optimization may include a determination that one or more criteria may be optimized to a greater extent by combination of multiple parts into a single process. For instance, material usage of a subtractive process may be reduced where multiple parts are machined from a single block; similarly, material usage in additive processes may be reduced where combination of multiple parts enables the use of lesser quantities of support volume. By a similar token, run time, setup time, and/or lead time, as well as any other parameters or production process attributes reliant thereon, may be substantially reduced by manufacturing multiple parts in a single process.

Still viewing FIG. 4, for a single designer seeking to make multiple different parts that may be manufactured together, optimization may differ from the case where multiple instances of a single part are to be manufactured; for instance, system 100 may determine that two separate designs have been submitted by a single designer, for a time-frame in which the single designer may wish to manufacture the two parts simultaneously. System 100 may then determine that the two parts may be combined in a single manufacturing process, and determine that lead time and/or setup time may therefore be reduced for each process; in one embodiment system 100 may present this revised time to a user as described in further detail below for multiple distinct designers. Alternatively or additionally, system 100 may present the two simulations together, for instance by merging them into a single simulation or displaying them separately while indicating stages in which the two simulations are combined.

Continuing to refer to FIG. 4, where two different designers' designs may simultaneously be manufactured, for instance where each designer needs a small number of prototypes or a single prototype, system 100 may evaluate combinations of designers' designs for optimization of one or more optimization criteria. As a non-limiting example, a first designer may submit a first design to system 100 and method 400 may produce a simulation that first designer selects. Subsequently, a second designer may submit a second design; system 100 may determine that first design is already scheduled to be produced at a particular manufacturer represented by a particular manufacturer avatar. As a result, system 100 may determine that a process to manufacture second design may be performed with a smaller amount of material, with less lead time, and/or other more optimal parameters than performance without combination at that manufacturer would afford; these greater optimizations may be presented to the second user. Optimizations may be presented to the second designer without revealing the first design; for instance, second designer may be informed that the first design is being combined with the second design, but omit details concerning the former, or may not inform second designer of the existence of first design at all. Simulation with increased optimization as a result of combination may be offered with time constraints; for instance, second designer may be notified via GUI or other means that the simulation is available only during the time range in which first design is being manufactured, which time range may, for instance, be presented as a window between two timestamps, dates/times, or the like. Alternatively or additionally, each party of multiple parties may agree to procure a part from a particular run of a manufacturing device only if or when a sufficient number of other parties also agree to the same; other parties may be visible or anonymous, and interrogator or other device may determine whether other parties' parts may be manufactured in the same run. In this sense the group of designers may benefit from use of a machine or process that otherwise would not be available to them, for example, because the size or quantity of the part is inadequate.

Continuing to refer to FIG. 4, method 400 may be implemented according to one or more parallel processing protocols. For instance, simulations of at least a simulation may be performed asynchronously as background tasks on secure server 104; as results are computed, they may be streamed to designer client, for instance using websocket protocols. Streamed results may be presented in real time as received or collected and displayed together. Manufacturer avatars may be prepared and stored in compiled form for rapid deployment. Tasks may be processed on multiple servers or processors, as managed, for example, by a work queue or message broker; persons skilled in the art of distributed computing, upon reading the entirety of this disclosure, will be aware of various options for distributed computing of tasks as described herein.

At optional step 430, secure server 104 initiates manufacture of the part using the selected manufacturing process. Initiation of manufacture may include performance of a first step in the removal from or deposition of material to create part; first step may include a particular milling or cutting operation, such as the performance of a registration cut, a first deposition of material in a fused deposition modeling process, or the like. First step may include location of a workpiece at an automated manufacturing device 160; location may include placement in a precise position and/or registration within a coordinate system used by automated manufacturing device 160 to guide particular manufacturing steps. First step may include generation of a control instruction initiating manufacturing steps; generation of a control instruction may include transmission of a signal to initiate manufacture and/or transmission of any machine control instruction sets generated as described above, including without limitation transmission of information for localized and machine-specific machine-control instruction generation. Transmission may be direct or indirect; for instance, transmission may involve transmission to a remote device that relays transmission to an automated manufacturing device 160 or computing device coupled thereto, or transmission to an auxiliary computing device or computer memory for transport to the automated manufacturing device 160 and/or computing device coupled thereto. System may produce toolpaths for use by automated device; such toolpaths may instruct a device to produce all or a portion of the part. For example, a toolpath may provide for bulk volume removal of a CNC machined part, which will then be further surfaced/refined by the manufacturer.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
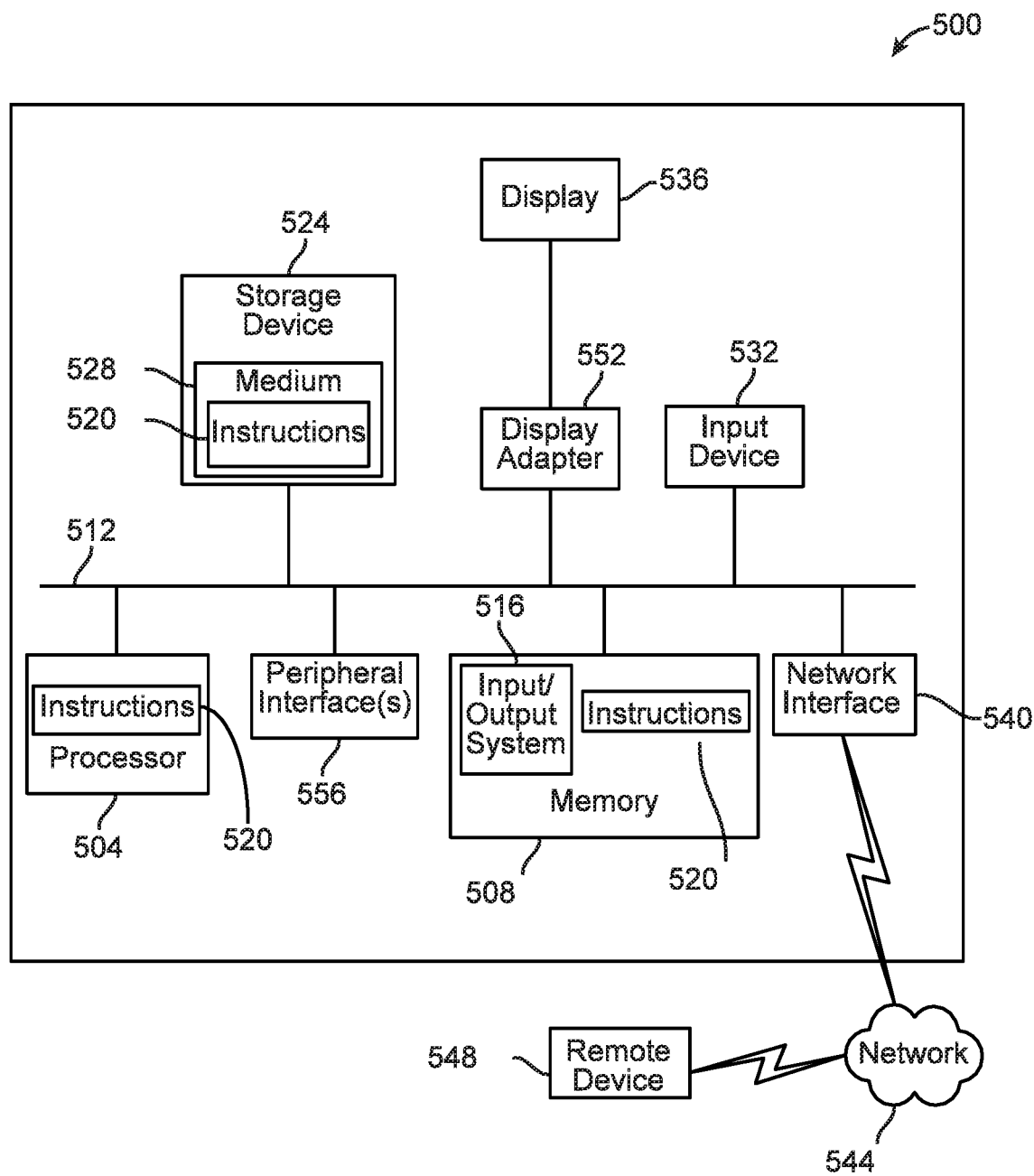
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system, such as the above-described systems and methods, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller 224, a peripheral bus, a local bus, and any combinations thereof, using any of a variety of bus architectures.

Memory 508 may include various components (e.g., machine-readable media) including, but not limited to, a random access memory component, a read only component, and any combinations thereof. In one example, a basic input/output system 518 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 538, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote device 152 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 538. Examples of a display device include, but are not limited to, a liquid crystal display (LCD), a cathode ray tube (CRT), a plasma display, a light emitting diode (LED) display, and any combinations thereof. Display adapter 552 and display device 538 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 558. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for secure, oblivious-client optimization of manufacturing processes, the system comprising:
   a secure server;
   a manufacturer exchange module executing on the secure server, wherein the manufacturer exchange module is designed and configured to:
     interface with a plurality of manufacturer clients, wherein the plurality of manufacturer clients corresponds to a plurality of manufacturers; and
     receive, from each manufacturer client of the plurality of manufacturer clients, an identification of a respective manufacturing device operated by a respective manufacturer according to a respective manufacturing constraint;
   an avatar generator executing on the secure server, the avatar generator designed and configured to generate a respective manufacturing avatar for each of at least a portion of the plurality of manufacturers,
     wherein each manufacturing avatar represents at least one respective manufacturer from the plurality of manufacturers,
     wherein each manufacturing avatar comprises a module, said module configured to simulate a behavior of at least a part of a respective manufacturer, and
     wherein generating each manufacturing avatar further includes:
       providing a unique manufacturer identifier associated with a respective manufacturer; and
       generating a respective manufacturing avatar as a function of at least the unique manufacturer identifier and a respective manufacturing constraint;
   a simulator executing on the secure server, the simulator designed and configured to:
     receive a design of a part to be manufactured using an automated manufacturing device and an optimization criterion; and
     simulate a first manufacturing process with a first manufacturing avatar; and an interrogator executing on the secure server, the interrogator designed and configured to select a material for at least one of the generated manufacturing avatars as a function of at least the part to be manufactured and a manufacturing constraint;

wherein the secure server is further configured to select a manufacturing process for manufacturing the part to be manufactured as a function of at least the simulation of at least the first manufacturing process with the first manufacturing avatar.

2. The system of claim 1, wherein the manufacturer exchange module further includes a manufacturer graphical user interface designed and configured to:
  prompt at least a user of a manufacturer client of the plurality of manufacturer clients to provide an identification of a manufacturing device and a respective manufacturing constraint;
  provide at least a graphical field for accepting a user instruction providing at least one of the identification of the manufacturing device and the respective manufacturing constraint; and
  receive, from the manufacturer client, at least one of the identification of the manufacturing device and the respective manufacturing constraint.

3. The system of claim 1, wherein the exchange module further comprises a cryptographic module designed and configured to encrypt data transmitted to manufacturer clients of the plurality of manufacturer clients and decrypt data received from manufacturer clients of the plurality of manufacturer clients.

4. The system of claim 1, further comprising a designer exchange module designed and configured to receive, from at least a designer client, the design of the part to be manufactured and the at least an optimization criterion.

5. The system of claim 4, wherein the designer exchange module further comprises a cryptographic module designed and configured to encrypt data transmitted to designer clients of the at least a designer client and decrypt data received from designer clients of at least a designer client.

6. A method of secure, oblivious-client manufacture optimization, the method comprising:
  receiving, at a manufacturer exchange module executing on a secure server, from each of a plurality of manufacturer clients corresponding to a plurality of manufacturers, an identification of a respective manufacturing device operated by a respective manufacturer according to a respective manufacturing constraint;
  generating, at the secure server, a respective manufacturing avatar for each of at least a portion of the plurality of manufacturers,
    wherein each manufacturing avatar represents at least one respective manufacturer from the plurality of manufacturers,
    wherein each manufacturing avatar comprises a module, said module configured to simulate a behavior of at least a part of a respective manufacturer,
    and wherein generating each manufacturing avatar further includes:
      providing a unique manufacturer identifier associated with a respective manufacturer; and
      generating a respective manufacturing avatar as a function of the unique manufacturer identifier and a respective manufacturing constraint;
  receiving a design of a part to be manufactured and an optimization criterion;
  generating a simulation of a first manufacturing process with a first manufacturing avatar as a function of the design of the part to be manufactured;
  selecting a material for at least one of the generated manufacturing avatars as a function of at least the part to be manufactured and a manufacturing constraint; and
  selecting a manufacturing process for manufacturing the part to be manufactured as a function of at least the simulation of at least the first manufacturing process with the first manufacturing avatar.

7. The method of claim 6, wherein receiving the identification of a respective manufacturing device and a respective manufacturing constraint further comprises:
  receiving, from a manufacturer client of the plurality of manufacturer clients, a text entry;
  identifying at least a command in a programming language in the text entry;
  converting the at least a command in the programming language into at least an executable command; and
  executing, by the manufacturer exchange module, the at least an executable command.

8. The method of claim 7, wherein the at least an executable command configures the manufacturer exchange module to define a new variable corresponding to a manufacturing constraint of the at least a manufacturing constraint and populate the new variable with the manufacturing constraint.

9. The method of claim 7, wherein the at least an executable command configures the manufacturer exchange module to define a new graphical field for accepting a user entry and to display the new graphical field at a display coupled to a manufacturer client of the plurality of manufacturer clients.

10. The method of claim 6, wherein generating each manufacturer avatar further comprises calculating a plurality of temporal dependencies on at least a respective design attribute.

11. The method of claim 10, wherein the at least a respective design attribute includes at least a workpiece orientation.

12. The method of claim 10, wherein the at least a respective design attribute includes feature geometry.

13. The method of claim 12, wherein the dependency on feature geometry depends on workpiece orientation.

14. The method of claim 10, wherein calculating the plurality of temporal dependencies further comprises generating at least a heuristic estimating temporal dependency on the at least a design attribute.

15. The method of claim 14, wherein generating the at least a heuristic further comprises:
  receiving, at the server, data describing at least an actual manufacturing process of at least a part from at least a design;
  relating the data describing the at least an actual manufacturing process to at least a first attribute of the at least a design; and
  generating the at least a heuristic as a function of the data describing the at least an actual manufacturing process to the at least a first attribute.

16. The method of claim 14, wherein the at least a heuristic estimates a temporal dependency on at least a second attribute not present in the at least a design.

17. The method of claim 10, wherein calculating the plurality of temporal dependencies further comprises:
  receiving, at the secure server, a first manufacturer avatar;

receiving, at the secure server, data describing at least an actual manufacturing process at a second manufacturer, wherein the second manufacturer is distinct from the first manufacturer; and calculating the plurality of temporal dependencies as a function of the avatar of the first manufacturer and the data describing the at least an actual manufacturing process, wherein the plurality of temporal dependencies includes a plurality of temporal dependencies for the second manufacturer.

18. The method of claim 6, wherein generating the simulation further comprises:

interrogating the design of the part to be manufactured to determine at least a geometric feature of the design; and simulating the first manufacturing process as a function of the at least a geometric feature.

19. The method of claim 18, wherein generating the simulation further comprises:

selecting a set of orientations for manufacturing the at least a geometric feature; and simulating the first manufacturing process as a function of the set of orientations and the at least a geometric feature.

20. The method of claim 6 wherein generating the simulation further comprises generating a plurality of simulations for a plurality of manufacturing processes, and wherein selecting further comprises:

determining, for each simulation of the plurality of simulations, a degree of optimization according to the at least an optimization criterion;

comparing the degree of optimization for each simulation of the plurality of simulations to the degree of optimization for at least one other simulation of the plurality of simulations; and selecting a manufacturing process as a function of the comparison.

21. The method of claim 6 further comprising initiating manufacture of the part to be manufactured using the selected manufacturing process.

* * * * *